US007475045B2

(12) United States Patent
Murashita et al.

(10) Patent No.: US 7,475,045 B2
(45) Date of Patent: Jan. 6, 2009

(54) TRANSACTION SYSTEM AND TRANSACTION TERMINAL EQUIPMENT

(75) Inventors: Kimitaka Murashita, Kawasaki (JP); Takashi Shinzaki, Kawasaki (JP); Shoji Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/999,080

(22) Filed: Nov. 30, 2004

(65) Prior Publication Data
US 2005/0119979 A1 Jun. 2, 2005

Related U.S. Application Data

(63) Continuation of application No. PCT/JP02/06794, filed on Jul. 4, 2002.

(51) Int. Cl.
*G06Q 99/00* (2006.01)

(52) U.S. Cl. ............................ 705/67; 710/33; 370/401; 709/203; 235/449

(58) Field of Classification Search .................. 710/33; 705/65, 17; 235/451, 492, 449, 379; 370/401; 709/203
See application file for complete search history.

(56) References Cited

U.S. PATENT DOCUMENTS

| 4,837,422 A | 6/1989 | Dethloff et al. ............. 235/380 |
| 5,530,232 A | 6/1996 | Taylor |
| 6,745,259 B2 * | 6/2004 | Wagner ....................... 710/33 |
| 2002/0074401 A1 * | 6/2002 | Madani ....................... 235/449 |
| 2002/0145051 A1 * | 10/2002 | Charrin ....................... 235/492 |
| 2003/0057278 A1 * | 3/2003 | Wong .......................... 235/451 |
| 2004/0177045 A1 * | 9/2004 | Brown .......................... 705/65 |

FOREIGN PATENT DOCUMENTS

| EP | 0 945 833 | 9/1999 |
| JP | 1-145798 | 6/1989 |
| JP | 6-19948 | 1/1994 |
| JP | 9-326001 | 12/1997 |

(Continued)

OTHER PUBLICATIONS

Rena Franklin and Bob Hallman, Mastercard international launches "smart card" pilot program, Sep. 26, 1985, PR Newswire.*
Point of Sale Hardware vendors prepare for the smart card push, May 31, 1996, Debit card news, vol. 1, No. 23, pp. 5.*
European Search Report and Annex of Application No. EP 02 74 3833 dated Apr. 21, 2006.

*Primary Examiner*—James P. Trammell
*Assistant Examiner*—Behrang Badii
(74) *Attorney, Agent, or Firm*—Staas & Halsey LLP

(57) ABSTRACT

In order to cause effective function when a system adopting a conventional settlement card is shifted to a system adopting a settlement card of IC card type and to enable a significant contribution to proliferation of the settlement card of IC card type, when a person who has input authentication data is authenticated as a user of a card by an authentication section, transaction data read by a magnetic stripe reader and transaction authentication data read by a memory reader are transmitted to a host server from transaction terminal equipment. The host server conducts a transaction through use of the transaction data and the transaction authentication data, both being output from the transaction terminal equipment. When the transaction is conducted, a memory writer writes data into memory of the card or rewrites data recorded in the memory.

3 Claims, 21 Drawing Sheets

FOREIGN PATENT DOCUMENTS

| | | |
|---|---|---|
| JP | 11-65959 | 3/1999 |
| JP | 11-203374 | 7/1999 |
| JP | 2000-200386 | 7/2000 |
| JP | 2001-291034 | 10/2001 |
| JP | 2002-150366 | 5/2002 |
| WO | 99/54841 | 10/1999 |
| WO | 01/55955 | 8/2001 |
| WO | 02/13134 | 2/2002 |

* cited by examiner

FIG. 4

| TYPES OF PASSWORDS | LIMITATIONS OF RESPECTIVE TRANSACTION TYPES | | | | | | USER |
|---|---|---|---|---|---|---|---|
| | INQUIRY ABOUT BALANCE ON ACCOUNT | DEPOSIT | WITHDRAWAL | MONEY TRANSFER | TIME DEPOSIT | CHANGE IN SETTINGS | |
| PASSWORD 1 | AUTHORIZED | AUTHORIZED | AUTHORIZED (WITHOUT LIMITATIONS) | AUTHORIZED | AUTHORIZED | AUTHORIZED | FATHER |
| PASSWORD 2 | AUTHORIZED | AUTHORIZED | AUTHORIZED (100,000 YEN) | AUTHORIZED | NOT AUTHORIZED | NOT AUTHORIZED | MOTHER |
| PASSWORD 3 | NOT AUTHORIZED | NOT AUTHORIZED | AUTHORIZED (10,000 YEN) | NOT AUTHORIZED | NOT AUTHORIZED | NOT AUTHORIZED | ELDER BROTHER |
| PASSWORD 4 | NOT AUTHORIZED | NOT AUTHORIZED | AUTHORIZED (5,000 YEN) | NOT AUTHORIZED | NOT AUTHORIZED | NOT AUTHORIZED | ELDER SISTER |

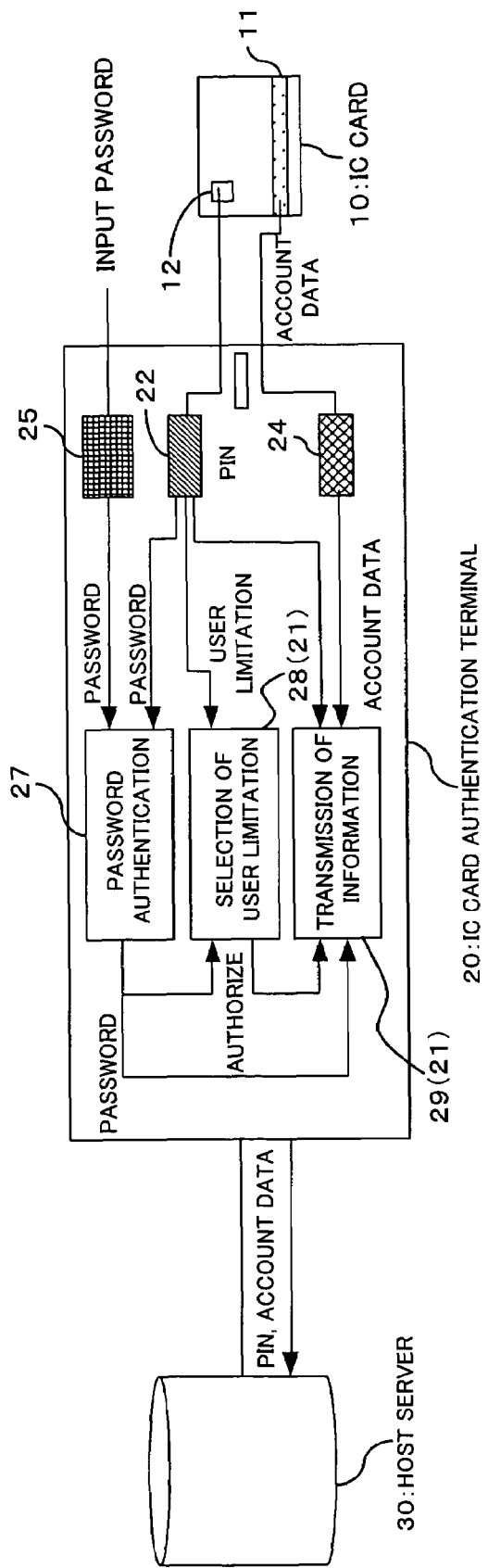

TRANSACTION SYSTEM AND TRANSACTION TERMINAL EQUIPMENT

This application is a continuing application, filed under 35 U.S.C. §111 (a), of International Application PCT/JP2002/006794, filed Jul. 4, 2002.

FIELD OF THE INVENTION

The present invention relates to a system for use in a transaction effected by way of an ATM (Automated Teller Machine) terminal using a cash card of a bank, a transaction conducted at a shop, through use of a debit card, and a transaction effected through use of a settlement card such as a credit card or a cash card; e.g., shopping/cashing effected through use of a credit card of a credit loan company, as well as to transaction terminal equipment for use in the system.

DESCRIPTION OF THE RELATED ART

In general, a magnetic stripe is affixed to the surface of a cash card of a bank or a credit card of a credit loan company (hereinafter these cards will be generically called "settlement cards"). Account data (e.g., the number of a trading bank, and an account number) are recorded as encrypted magnetic data in the magnetic stripe.

An ATM terminal reads the account data recorded in the magnetic stripe by means of a magnetic stripe reader, and the account data are transmitted to a host along with a Personal Identification Number (usually consisting of four digits) entered by a user by way of the ATM terminal. On the basis of the account data received from the ATM terminal, the host extracts the user's PIN from a customer database and compares the thus-extracted PIN with the PIN transmitted from the ATM terminal, to thus authenticate the user. When the identity of the user is verified by a coincidence between the PINs, the host notifies the ATM terminal of verification of the identity, thereby initiating a transaction with the user.

In recent years, an IC card with embedded IC (Integrated Circuit) memory, such as FRAM (Ferroelectric Random Access Memory), has come to be used as a settlement card, as well. Such IC cards have already been used as commuter rail passes for JR (Japan Railways) Companies. Generally, the IC card has features (1) to (3) such as those provided below.

(1) Data can be written in the IC card.

(2) Since authentication processing is performed within the card, security performance higher than that exhibited by the settlement card using the magnetic stripe can be achieved.

(3) When the FRAM is used as IC memory, a power source is not required, nor is a connection terminal required (the card is contactless).

As mentioned previously, the currently, commonly utilized settlement card with a magnetic stripe usually employs a PIN consisting of four digits in order to authenticate the identity of the user. The terminal equipment of the ATM terminal transmits the PIN entered through operation and transaction data (e.g., the account number of a trading bank, and a card number) written in the magnetic stripe to the host, where the identity of the user is authenticated.

Such a settlement card has hitherto been used in the terminal equipment installed in the bank and used as far as a person (an employee of the bank) can see, whereby security of the settlement card is ensured. Areas where the settlement cards are used spread to common places around the user, such as a department store or a convenience store. Under such circumstances, authentication of the identity based on usage of a four-digit PIN is very vulnerable.

For this reason, the foregoing IC card has been put forward, and utilization of the IC card is initiated. Since the IC card holds memory within the settlement card in place of the magnetic stripe, the IC card has a characteristic of storing a larger volume of data as compared with the conventional type of settlement card using a magnetic stripe, and another characteristic of the ability to write data into memory as well as to read data from the memory. In future, the IC card is expected to replace the conventional type of settlement card using a magnetic stripe.

In the meantime, the following problems (1) to (3) are encountered in spreading the settlement cards such as the IC cards.

(1) In addition to changing the terminal equipment, such as the ATM terminal, to be compatible with the IC card, the host must be changed so as to be compatible with the data stored in the IC card. Specifically, the entire system using the settlement card must be changed.

(2) In order to change the data (e.g., a password or the like) stored in the memory of the IC card in accordance with the user's desire when desired, the user must have an IC card writer in order to change the data in accordance with the user's desire.

(3) Even when the user does not have any IC card writer, contents of the memory can be rewritten, so long as the IC card writer is placed on the ATM terminal or a sales counter. In this case, there arises a problem of a failure to make a change when the user desires the change or a problem of provoking congestion at the terminal or the sales counter.

The present invention has been conceived in view of these problems and aims at providing a transaction system and transaction terminal equipment, which enable installation of transaction terminal equipment that is compatible with a settlement card of IC card type having built-in memory without changing the configuration of a host and which can effectively function at the time of transition of a system adopting a conventional settlement card with a magnetic stripe to a settlement card of IC card type, thereby contributing to significant promotion of proliferation of the settlement card of IC card type.

The present invention also provides a transaction system and transaction terminal equipment, which enable virtual writing or rewriting of desired data into memory of a settlement card of IC card type when a user so desires without the user having to possess a special card writer or to wait in a line in front of an ATM terminal or the window to rewrite contents of memory or the like.

SUMMARY OF THE INVENTION

To achieve the object, a transaction system of the present invention is characterized by comprising: a card having a magnetic stripe on which are recorded transaction data required for conducting a transaction, and memory which enables reading and writing of electronic data and on which are recorded transaction authentication data and user authentication data required to authenticate a user of the card; transaction terminal equipment having a magnetic stripe reader for reading the data from the magnetic stripe of the card, a memory reader for reading the data from the memory, a memory writer for writing the electronic data into the memory, and an input section for inputting authentication data to be used for authenticating the user of the card; a host server which is connected to the transaction terminal equipment in a communicable manner and which conducts the transaction on the basis of the data read from the magnetic stripe of the card or from the memory of the card; and an authentication section which authenticates a person who has input the authentication data as the user of the card by means of comparing the authentication data input by way of the input section with the user authentication data read from the memory by means of the memory reader, wherein the transaction data read by the magnetic stripe reader and the transaction authentication data read by the memory reader are transmitted from the transaction terminal equipment to the host server when the person who has input the authentication data is authenticated as the user of the card by the authentication section; the host server conducts the transaction through use of the transaction data and the transaction authentication data, both having been output from the transaction terminal equipment; and the memory writer writes data into the memory of the card or rewrites data written in the memory when the transaction is carried out.

A transaction system of the present invention is also characterized by comprising a card on which are recorded transaction data required for a transaction; transaction terminal equipment having a reader for reading the transaction data from the card; and a host server which is connected to the transaction terminal equipment in a communicable manner and which conducts the transaction on the basis of the transaction data read from the card, wherein an electronic mail address of the user of the card is registered in advance in the card or the host server, and the transaction terminal equipment or the host server transmits the details of transactions to the electronic mail address every time the transaction is conducted.

A transaction system of the present invention is further characterized by comprising a card on which are recorded transaction data required for a transaction; transaction terminal equipment having a reader for reading the transaction data from the card; and a host server which is connected to the transaction terminal equipment in a communicable manner and which conducts the transaction on the basis of the transaction data read from the card, wherein a writer for registering in the card data pertaining to a transaction counterpart of the user of the card at the time of execution of the transaction is provided in the transaction terminal equipment.

Transaction terminal equipment of the present invention is for making an access to a card having a magnetic stripe on which are recorded transaction data required to conduct a transaction, and memory which enables reading and writing of electronic data and on which are recorded transaction authentication data and user authentication data required to authenticate a user of the card prior to the transaction. The terminal equipment comprises a magnetic stripe reader for reading the data from the magnetic stripe of the card, and a memory reader for reading the data from the memory; a memory writer for writing the electronic data into the memory; and an input section for inputting authentication data to be used for authenticating the user of the card, wherein the terminal equipment is connected, in a communicable manner, to a host server which conducts the transaction; the data read from the magnetic stripe of the card or from the memory are transmitted to the host server when the person who has input the authentication data is authenticated as a user of the card as a result of the authentication data input by way of the input section being compared with the user authentication data read from the memory by mean of the memory reader; and the memory writer writes data into the memory of the card or rewrites data recorded in the memory when the transaction is conducted.

As mentioned above, the present invention yields the following effects or advantages.

(1) When the person who has input authentication data (a password or the like) is authenticated as the user of the IC card, the transaction data read from the magnetic stripe of the card and the transaction authentication data read from the memory of the card are transmitted to the host server. The host server conducts a transaction in accordance with these data sets. As a result, the transaction authentication terminal compatible with a settlement card of IC card type can be installed without changing the configuration of the host server. Specifically, the configuration of the host server still remains identical with that of the conventional host server. Hence, the transaction system to which the present invention is applied allows mixing of the transaction terminal of the present invention and the transaction terminal equipment for use with a conventional settlement card having a magnetic stripe. When the system adopting the conventional settlement card is shifted to the system adopting the IC card type, the entire system does not need to be collectively changed, and a shift from one system to another system can be performed at low cost. Consequently, the present invention effectively functions at the time of the previously-described system shift, thereby greatly contributing to significant proliferation of the settlement card of IC card type.

(2) According to the present invention, the memory writer writes data into the memory of the card or rewrites the data recorded in the memory, at the time of conduction of a transaction. Specifically, the user can write data or rewrite the data in the memory of the card simultaneously with conducting a desired transaction by way of the transaction terminal equipment without standing in a line in front of the ATM terminal or at a window for rewriting the data, or the like, in the memory, even when not having a special card writing device (IC card writer).

(3) Transaction requirements previously set for the user of the card are recorded in the memory of the card. A transaction is conducted in accordance with the transaction requirements. As a result, details of the transaction which can be conducted by the user can be limited to a range set by the transaction requirements.

(4) User authentication data pertaining to a plurality of users are recorded in the memory of the card, and transaction requirements (e.g., the amounts of withdrawable money) set in advance for the respective users are recorded in the memory of the card. When the authentication data input byway of the input section have coincided with any one of the plurality of user authentication data sets, a transaction is conducted in accordance with the transaction requirements corresponding to the user. As a result, a plurality of users can share a single transaction account; that is, a single card. Moreover, details (e.g., a withdrawal of cash) of a transaction which the user can conduct can be limited to a range (e.g., the amount of withdrawable money) set by the transaction requirements.

(5) When the transaction requirements are set, the transaction requirements can be updated in accordance with the details of a transaction on the basis of the result of the transaction conducted by the host server, by means of changing the transaction requirements in the memory of the card through use of the memory writer. At this time, the reset timing at which transaction requirements are to be reset and initial requirements of the transaction requirements have been set in advance. When a transaction using the card is first conducted after the time of reset, the memory writer resets the transaction requirements in the memory of the card in accordance with the initial requirements. As a result, the transaction requirements can be automatically rewritten to the initial requirements every predetermined period; e.g., the transaction requirements can be automatically rewritten so as to add (accumulate) the amount of withdrawable money to the amount of money set in accordance with the initial requirements.

(6) Upon receipt of a writing/rewriting request pertaining to the memory of the card, the host server temporarily holds new data (e.g., user authentication data, transaction requirements, an electronic mail address of the user of the IC card, or the like) corresponding to the request. Subsequently, when a transaction is first conducted through use of the card of interest, the memory writer of the transaction terminal equipment writes the new data into the memory of the card, or rewrites the data stored in the memory to the new data. As a result, the data in the card can be written or rewritten virtually at the user's desire, even when the user does not possess a special card writer (IC card writer) or does not wait in a line in front of an ATM terminal or the window to rewrite data in the memory or the like.

(7) The electronic mail address of the user is recorded in the memory of the card or the host server. After completion of the transaction, the transaction terminal equipment or the host server immediately transmits the details of the transaction to the electronic mail address. Thereby, the user can save the details of the transaction as an electronic mail (electronic data). In the event that a card has been fraudulently used, the user can immediately ascertain fraudulent use of the card.

(8) Details of the transaction are written and stored in the memory of the card by means of the memory writer after completion of the transaction. By means of this, the company (e.g., a bank or a credit loan company) to which the host server belongs does not need to issue the transaction statement in paper, and the history of transactions does not need to be stored in the host server, thereby rendering effective utilization of memory. At this time, the electronic mail address of the user is recorded in the memory of the card. When a transaction is conducted, details of the transaction are read from the memory reader and sent to the electronic mail address. Thereby, the user can acquire details of the transaction recorded in the memory of the card as an electronic mail (electronic data).

(9) Data pertaining to a transaction counterpart of the card user (e.g., an account number to which money is to be transferred or the like) are changed or written into the memory of the card when a transaction is conducted through use of the card. When another transaction with the transaction counterpart is conducted next time through use of the card, input of data pertaining to the transaction counterpart becomes unnecessary, thereby simplifying an operation to be performed by the user by way of the transaction terminal equipment.

BRIEF DESCRIPTION OF THE DRAWINGS

FIG. 4 is a view showing examples of a password and examples of transaction requirements according to the first embodiment;

FIG. 5 is a view for describing a second operation example of the first embodiment;

DESCRIPTION OF THE PREFERRED EMBODIMENTS

Embodiments of the present invention will be described hereinbelow by reference to the drawings.

[1] Descriptions of a First Embodiment

Figure 1:
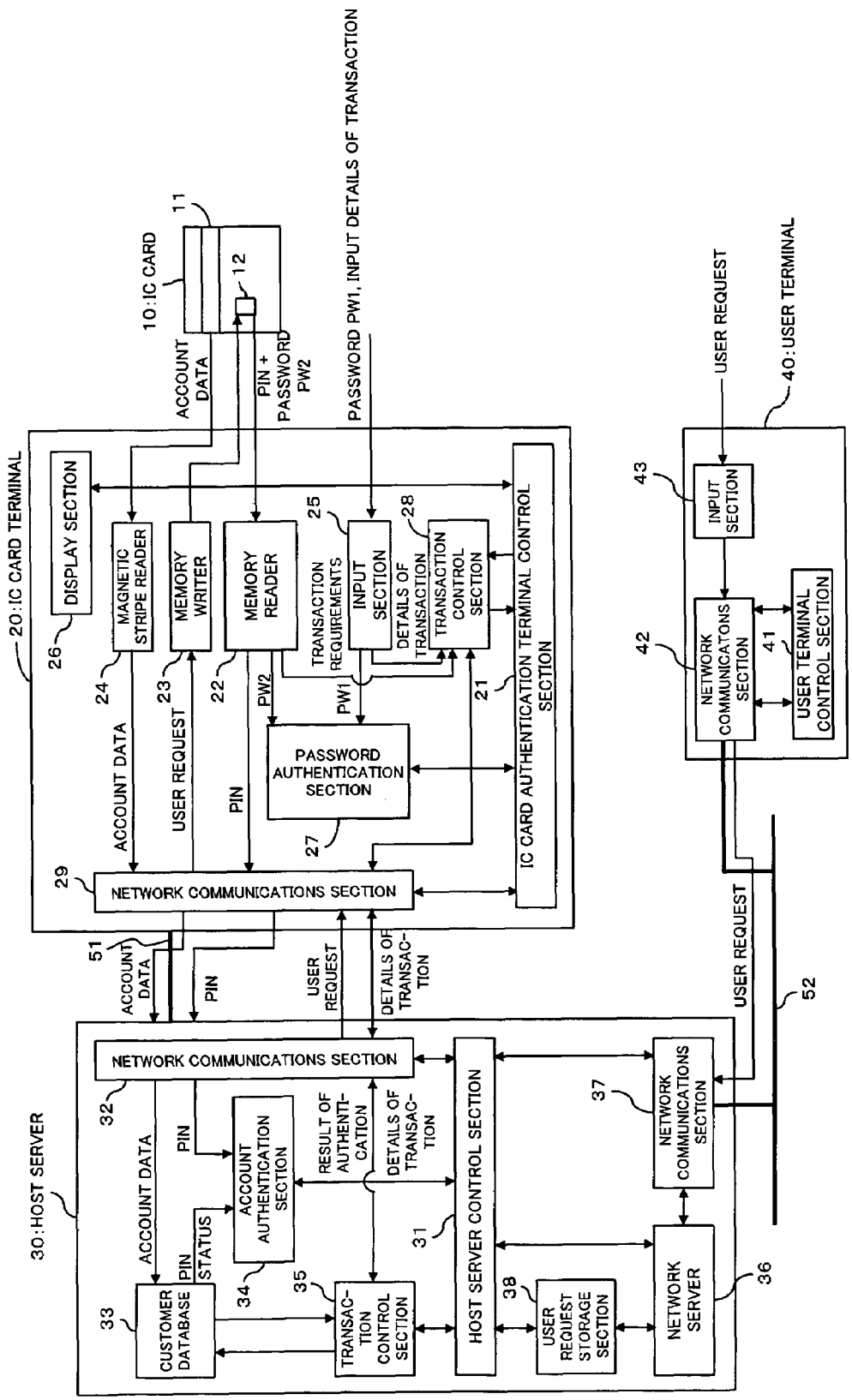
FIG. 1 is a block diagram showing the configuration of a transaction system serving as a first embodiment of the present invention.

FIG. 1 is a block diagram showing the configuration of a transaction system serving as a first embodiment of the present invention. As shown in FIG. 1, the transaction system of the first embodiment comprises an IC card 10, an IC card authentication terminal 20, a host server 30, a user terminal 40, a network 51, and another network 52.

The IC card (a settlement card of IC card type) 10 is used as, e.g., a cash card, a debit card, a credit card, or the like. In the embodiment, a magnetic stripe 11 is affixed to an exterior surface of the IC card 10, and an IC memory 12 is embedded in the same.

Transaction data (e.g., the account number of a trading bank and account data such as an account number) required for transaction are recorded in advance in the magnetic stripe 11.

The IC memory 12 is memory which enables writing or reading of electronic data. In the embodiment, e.g., data sets (1) to (4) such as those provided below are recorded in advance as electronic data in the IC memory 12.

(1) Authentication data for transaction (e.g., a PIN of four digits which has hitherto been input by a user by way of an ATM terminal in the embodiment) required for authentication which is conducted before a transaction using transaction data recorded on the magnetic stripe 11.

(2) User authentication data (a password or a pass-phrase in the embodiment) required to authenticate the identity of the user of the IC card 10 (authenticate the user as the holder of the IC card 10). Anything differing in format from the conventional PIN (four digits) is used a password (pass-phrase), which is formed from a character string, e.g., alphanumerics, Japanese hiragana, Japanese katakana, Chinese characters, or symbols. As will be described later by reference to FIG. 4, a plurality of user authentication data sets (passwords) corresponding to, e.g., individual members of a family, may be recorded.

(3) Transaction requirements set in advance for the user of the IC card 10. As will be described later herein below by reference to FIG. 4, authorized/not authorized to conduct various transactions, and a withdrawable amount, for example, are set as transaction requirements. When a plurality of user authentication data sets (passwords) are registered in the IC memory 12, transaction requirements may be set on a per-user basis, as will be described later by reference to FIG. 4. The transaction requirements may be recorded in association with user authentication data pertaining to respective users.

(4) Electronic mail address of the IC card 10 of the user The IC card authentication terminal (e.g., an ATM terminal for use with an IC card, or transaction terminal equipment) 20 is installed in a bank or a shop such as a convenience store. When the user conducts a transaction, such as a withdrawal of money, deposition of money, or a money transfer, through use of the IC card 10, access is made to the IC card 10 inserted into an insert slot. The IC card authentication terminal 20 is constituted of an IC card authentication terminal control section 21, a memory reader 22, a memory writer 23, a magnetic stripe reader 24, an input section 25, a display section 26, a password authentication section 27, a transaction control section 28, and a network communications section 29.

The IC card authentication terminal control section 21 manages and controls operations of individual sections (designated by reference numerals 22 to 29) constituting the IC card authentication terminal 20.

When a transaction is conducted through use of the IC card 10, the memory reader 22 reads a PIN or password from the IC memory 12. When conducting a transaction through use of the IC card 10, the magnetic stripe reader 24 reads from the magnetic stripe 11 the number of a trading bank and an account number.

When the user conducts a transaction through use of the IC card 12 by way of the IC card authentication terminal 20, the memory writer (writer) 23 newly writes electronic data into the IC memory 12 or rewrites the electronic data (contents) written in the IC memory 12, as will be described later, in accordance with a command from the host server 30 and the IC card authentication terminal control section 21. Contents to be newly written into the IC memory 12 by means of the memory writer 23 or contents to be rewritten are, e.g., previously-described authentication data for transaction (a PIN), user authentication data (a password or pass-phrase), transaction requirements, an electronic mail address, or the like.

The input section 25 is for inputting various data sets (details of a transaction or the like) required by the user to conduct a transaction through use of the IC card 10. The input section is constituted as a keyboard or a touch panel doubling as the display section 26 to be described later. Particularly, in order to make the IC card authentication terminal 20 (the password authentication section 27) authenticate the identity of the user of the IC card 10, the input section 25 of the present embodiment is also used by the user to input authentication data (a password in the embodiment).

The display status of the display section 26 is controlled by the IC card authentication terminal control section 21 and displays, to the user, a display on the touch panel or various data sets required to carry out a transaction. This display section 26 is embodied by, e.g., a CRT (Cathode Ray Tube) or an LCD (Liquid Crystal Display).

The password authentication section (authentication section) 27 compares the password input by the user by way of the input section 25 with the password read from the IC memory 12 by the memory reader 22. When the passwords coincide with each other, the user who has input the password (the person who inputs a password) is authenticated as the true user (holder) of the IC card 10. Under a circumstance where a plurality of passwords have been read from the IC memory 12, when the password input by way of the input section 25 coincides with any one of the plurality of passwords, the password authentication section 27 authenticates the person who has input the password as the true user. After having authenticated the person who has input the password as the true user, the password authentication section 27 sends a notification to this effect to the IC card authentication terminal control section 21.

The transaction control section 28 is for controlling a transaction in accordance with details of the transaction input by way of the input section 25 and delivers data complying with the details of the transaction, such as a command or a request, to the host server 30 by way of the network communications section 29 and the network 51. When the person who has input the password is authenticated as the true user and when the transaction requirements corresponding to the password are read from the IC memory 12 by means of the memory reader 22, the transaction control section 28 of the embodiment has the function of determining whether or not details of the transaction input by way of the input section 25 fall within the range set by the transaction requirements. When the details of the transaction have been determined to fall within the range by means of the foregoing function, the transaction control section 28 causes the transaction processing to continue. In contrast, when the details have been determined to fall outside the range, the transaction control section commands the IC card authentication terminal control section 21 to send to a person who requests a transaction (the user of the IC card 10) a notification indicating that the details of the transaction are not acceptable. Notification is performed through use of, e.g., the display section 26.

The network communications section 29 functions as a communications interface which exchanges data with the host server 30 by way of the network 51. In addition to receiving data pertaining to the transaction from the host server 30, the network communications section transmits to the host server 30 the account data read by the magnetic stripe reader 24, the PIN read by the memory reader 22, and the data pertaining to details of the transaction output from the transaction control section 28. Moreover, the network communications section 29 also performs the function of receiving from the host server 30, e.g., a request to write data into the IC memory 12 or a request to rewrite the data in the IC memory 12.

The host server (bank server) 30 is installed in a bank or a credit loan company, or the like, and connected in a communicable manner to the previously-described IC card authentication terminal 20 by way of the network 51. The host server receives the account data, the PIN, and details of a transaction from the IC card authentication terminal 20, and conducts a transaction on the basis of the thus-received account data, the PIN, and details of the transaction.

The host server 30 is connected in a communicable manner to the user terminal 40 by way of the network 52. Upon receipt, from the user terminal 40, of a request to write data into the IC memory 12 or a request to rewrite data of the IC memory 12, the host server temporarily reserves the request or the data to be written/rewritten. When the transaction using the IC card 10 which is an object of the request is actually conducted with the IC card authentication terminal 20 or the host server 30, the request or the data to be written/rewritten are transferred to the IC card authentication terminal 20.

In order to fulfill the functions such as those mentioned previously, the host server 30 comprises a host server control section 31, a network communications section 32, a customer database 33, an account authentication section 34, a transaction control section 35, a network server 36, a network communications section 37, and a user request storage section 38. An existing host server commonly used in a bank, a credit loan company, or the like, is also provided with the host server control section 31, the network communications section 32, the customer database 33, the account authentication section 34, and the transaction control section 35.

The host server control section 31 manages and controls operations of individual sections constituting the host server 30 [including sections designated by reference numerals 32 to 38, or a transaction statement generation section 39 (see FIG. 11) in a second embodiment].

The network communications section 32 functions as a communications interface which exchanges data with the IC card authentication terminal 20 by way of the network 51. The network communications section transmits to the IC card authentication terminal 20 data (including various requests or the like) pertaining to a transaction, or receives from the IC card authentication terminal 20 data pertaining to details of a transaction, in conjunction with the account data and the PIN.

The customer database 33 is for reserving various data sets pertaining to customers who have opened accounts. Stored as various data sets in the customer database 33 are a previously-registered authorized PIN and a status showing whether or not an account assigned to an account number can conduct a transaction. When the network communications section 32 has received the account data, the PIN and the status, both corresponding to the account number, in the account data are read from the customer database 33 to the account authentication section 34.

The account authentication section 34 determines whether or not a transaction can be conducted with the account, which is an object of transaction, by reference to a status read from the customer database 33 and compares the PIN read from the customer database 33 with the PIN received by the network communications section 32, to thus authenticate the user. When the account is authenticated as being compatible with conducting a transaction and when the user is authenticated by a coincidence between the two PINs, a notification to this effect (a transaction authorization) is sent to the host server control section 31, thereby initiating the transaction. When the account is not compatible with conducting a transaction or when a mismatch exists between the previously-described two PINs, processing is terminated without initiating a transaction after a notification to this effect (a transaction denial) has been sent to the IC card authentication terminal 20 by way of the host server control section 31, the network communications section 32, and the network 51.

Upon receipt of the transaction authorization notification from the account authentication section 34 by way of the host server control section 31, the transaction control section 35 performs transaction control complying with the details of the transaction received by the network communications section 32, by reference to the data pertaining to the account—which is an object of transaction—in the customer database 33. In the host server 30 of the embodiment, the transaction control section 35 performs transaction control operation such that the transaction authorized by the transaction control section 28 of the IC card authentication terminal 20 (i.e., a transaction falling within the range set by the transaction requirements) is carried out. Specifically, the transaction complying with the transaction requirements previously registered in the IC memory 12 is carried out.

The network server 36, the network communications section 37, and the user request storage section 38 are those required when the user issues a request to the IC card 10 or the account from the user terminal 40 disposed in the user's home or office; that is, units to be added to an existing host server.

The network server 36 and the network communications section 37 are installed to enable the user to exchange data with the host server 30. The network server 36 is preferably configured as a server to which access can be made by standard browser software, such as a WWW (World Wide Web) server, so that the user can make an access in a common Internet environment.

The network communications section 37 functions as a communications interface which exchanges data with the user terminal 40 by way of the network 52.

Upon receipt, from the user terminal 40, of the request to write data into the IC memory 12 or the request to rewrite data in the IC memory 12, the user request storage section 38 temporarily stores the request or the data to be written/rewritten. In reality, the user request storage section is embodied by existing memory (RAM or a hard disk drive) constituting the host server 30.

As will be described by reference to FIGS. 7 through 10, the transaction system of the embodiment can rewrite the data in the IC memory 12 of the IC card 10 or write new data into the IC memory 12 when the transaction using the IC card 10 is made, in connection with the IC card authentication terminal 20. The data to be written or the data to be rewritten, both being employed in the embodiment, are summarized as described in the following items (11) to (13).

(11) The transaction requirements stored in the IC memory 12 of the IC card 10 (e.g., the amount of withdrawable money and the number of possible withdrawals, which are set for each user) are rewritten by the memory writer 23 on the basis of the result of the transaction conducted by the host server 30. Such are writing operation will be described later by reference to FIG. 7.

(12) In a case where a reset timing at which the transaction requirements in the IC memory 12 of the IC card 10 are to be reset and initial requirements of the transaction requirements are set in advance, the transaction requirements in the IC memory 12 of the IC card 10 are reset by the memory writer 23 in accordance with the initial requirements when a first transaction using the IC card 10 is conducted after the reset timing. Such a reset operation will be described later by reference to FIG. 8.

(13) The host server 30 has received, from the user terminal 40, the request to write data into the IC memory 12 of the IC card 10 or the request to rewrite the data recorded in the IC memory 12 and stores the request or the data to be written/rewritten in the user request storage section 38. In such a case, when a transaction using the IC card 10, which is an object of the write request/rewrite request, is first conducted after receipt of the request, the memory writer 23 writes new data into the IC memory 12 of the IC card 10 or rewrites the data recorded in the IC memory 12 to the new data. Such writing/rewriting operation will be described by reference to FIGS. 9 and 10.

In relation to item (13), conceivable data to be written/rewritten include [1] a password (pass-phrase); [2] transaction requirements set for each password (pass-phrase); [3] an electronic mail address of the user of the IC card 10; and [4] data pertaining to a transaction counterpart (account data or the like) of the user of the IC card 10. A specific example where data pertaining to the user's transaction counterpart are written will be described in detail in connection with a third embodiment.

The user terminal 40 is a piece of personal terminal equipment, such as a personal computer, which is connected to the host server 30 in a communicable manner by way of the network 52; which is installed in a home or office; and which is held by the user of the IC card 10. The user terminal 40 may be a portable cellular phone or a PDA (Personal Data Assistants) connected to a portable cellular phone, as well as a personal computer. The user terminal 40 is used when the user issues a request to write data into the IC memory 12, a request to rewrite the data in the IC memory 12, or a request for an account. The user terminal is constituted of a user terminal control section 41, a network communications section 42, and an input section 43.

The user terminal control section 41 manages or controls operations of individual sections (reference numerals 42, 43) constituting the user terminal 40.

The network communications section 42 functions as a communications interface which exchanges data with the host server 30 by way of the network 52. The network communications section transmits, to the host server, a request to write data into the IC memory 12, a request to rewrite data in the IC memory 12, and a request for the account.

The input section 43 is for inputting various data (details of transactions or the like) and is constituted of a common keyboard or a mouse. In the embodiment, the input section is used for inputting a request to write data into the IC memory 12, a request to rewrite the data in the IC memory 12, and a request for an account.

In the embodiment, the network 51 interposed between the IC card authentication terminal 20 and the host server 30 is made different from the network 52 interposed between the host server 30 and the user terminal 40. The networks 51, 52 may be embodied by the same network. In such a case, however, when an open network, such as the Internet, is used as a network, security must be ensured.

For instance, a VPN (Virtual Private Network) using an IPSec (Security Architecture for Internet Protocol) is provided between the IC card authentication terminal 20 and the host server 30, and an SSL (Secure Socket Layer) is provided on the part of the host server 30 between the host server 30 and the user terminal 40, thereby ensuring security. In this case, the networks are physically identical with each other. However, since different security ensuring means are ensured, the networks can be deemed to be logically different from each other.

Operation of the transaction system of the first embodiment having the foregoing configuration will be described by reference to FIGS. 1 through 10.

In the embodiment, the account data—which are used in the existing magnetic stripe settlement card (a conventional card) as well—are stored in the magnetic stripe 11 of the IC card 10. Various data required to fulfill IC card service, such as a password or customer data (a PIN manually input by means of a conventional system), are stored in the IC memory 12.

Thus, existing data are stored in the magnetic stripe 11, and data for use with an IC card service are stored in the IC memory 12, whereby the IC card compatible terminal (the IC card authentication terminal 20) can receive service for the IC card 10. A terminal which is not compatible with the IC card 10 (e.g., a conventional card authentication terminal 20A shown in FIG. 2) can receive service of a conventional magnetic stripe settlement card through use of only the magnetic stripe 11.

Figure 2:
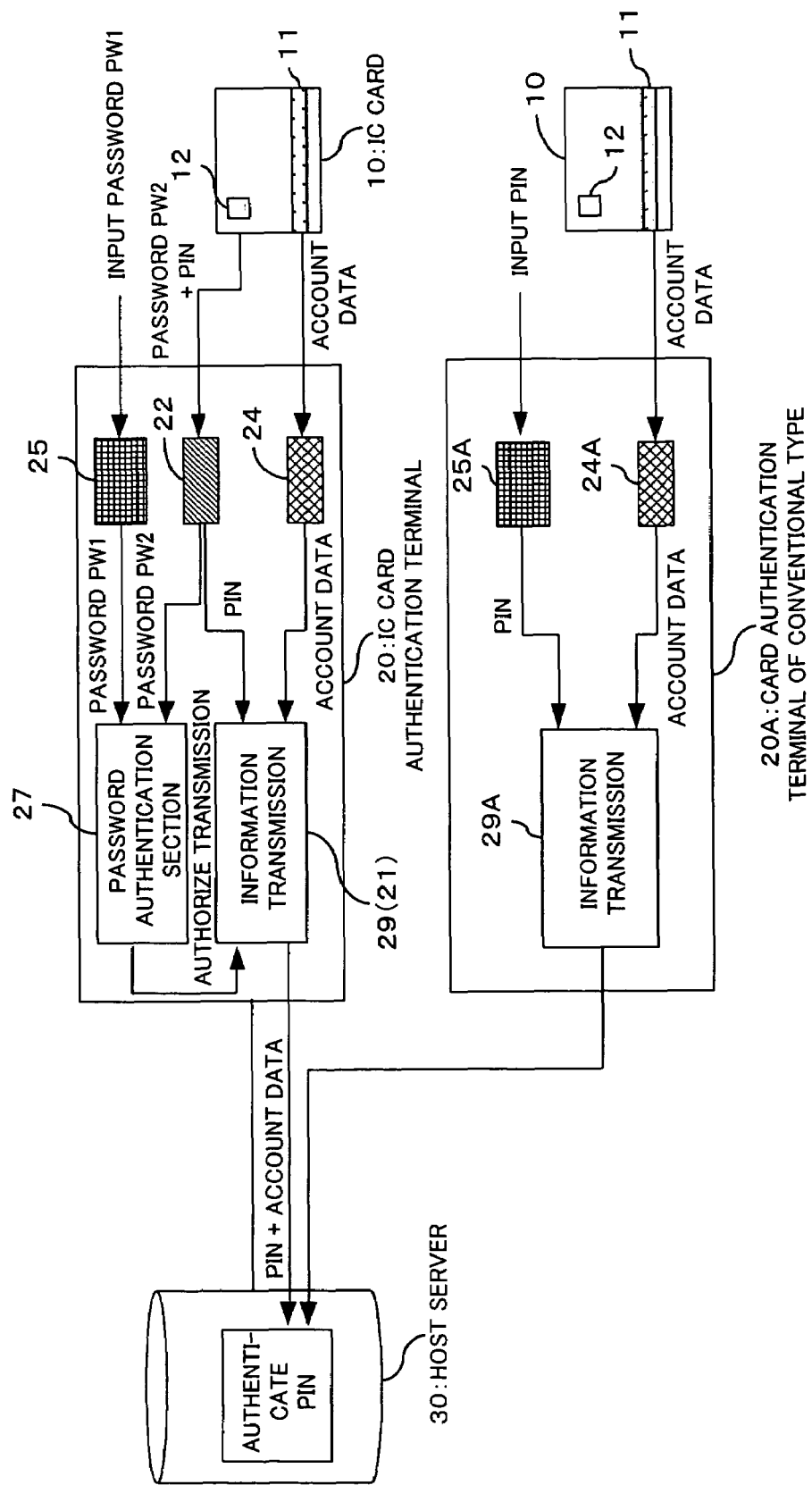
FIG. 2 is a view for describing a first operation example of the first embodiment.

Specifically, as shown in FIG. 2, the user can conduct a transaction by way of the IC card authentication terminal 20, through use of the IC card 10 (the magnetic stripe 11 and the IC memory 12) as will be described later. In the meantime, the user can also conduct a transaction by way of the conventional card authentication terminal 20A, as well, in the same manner as that employed conventionally, through use of the IC card 10 (only the magnetic stripe 11).

In FIG. 2, the conventional card authentication terminal (the ATM terminal for use with the conventional card) 20A is analogous to that of the existing ATM terminal. Although not provided with means for making an access to the IC memory 12, the conventional card authentication terminal is provided with at least a magnetic stripe reader 24A, an input section 25A, and a network communications section 29A and connected to the host server 30 in a communicable manner by way of the network 51.

When the IC card 10 is inserted into the terminal 20A by the user, the magnetic stripe reader 24A reads the account data recorded on the magnetic stripe 11 of the IC card 10. The PIN (four digits) is input by the user by way of the input section 25A. The account data and the PIN are transmitted to the host server 30 by way of the network communications section 29A and the network 51. On the basis of the account data received from the terminal 20A, the host server 30 extracts the PIN of the user in the customer database 33 (see FIG. 1), and compares the extracted PIN with the PIN transmitted from the terminal 20A, thereby authenticating the user. When the user is authenticated as a result of the PINs having coincided with each other, the host server 30 sends a notification to this effect to the terminal 20A, thereby commencing a transaction. Accordingly, a transaction can be conducted by using the IC card 10 of the embodiment without making any change in the existing system.

When the user has inserted the conventional settlement card having only a magnetic stripe (not having the IC memory) into the IC card authentication terminal 20 of the present embodiment, the account data read by the magnetic stripe reader 24 and the PIN input by the user by way of the input section 25 are transmitted to the host server 30, whereby authentication and a transaction are conducted as before. Consequently, the transaction system of the embodiment can also conduct a transaction involving usage of the conventional settlement card, as before.

A first operation example (basic operation) of the transaction system of the first embodiment will now be described by reference to FIGS. 1 through 3. FIG. 2 is a view for describing the first operation example of the transaction system, and FIG. 3 is a flowchart (steps S1 to S7) for describing the first operation example of the transaction system.

When the user inserts the IC card 10 into the IC card authentication terminal 20 on occasion of initiation of the transaction involving usage of the IC card 10 by means of the IC card authentication terminal 20, the IC card authentication terminal control section 21 displays guidance on the display section 26, thereby prompting the user to input a password. As shown in FIGS. 1 and 2, the user inputs a password PW1 for authentication from the input section 25 in accordance with the guidance.

Figure 3:
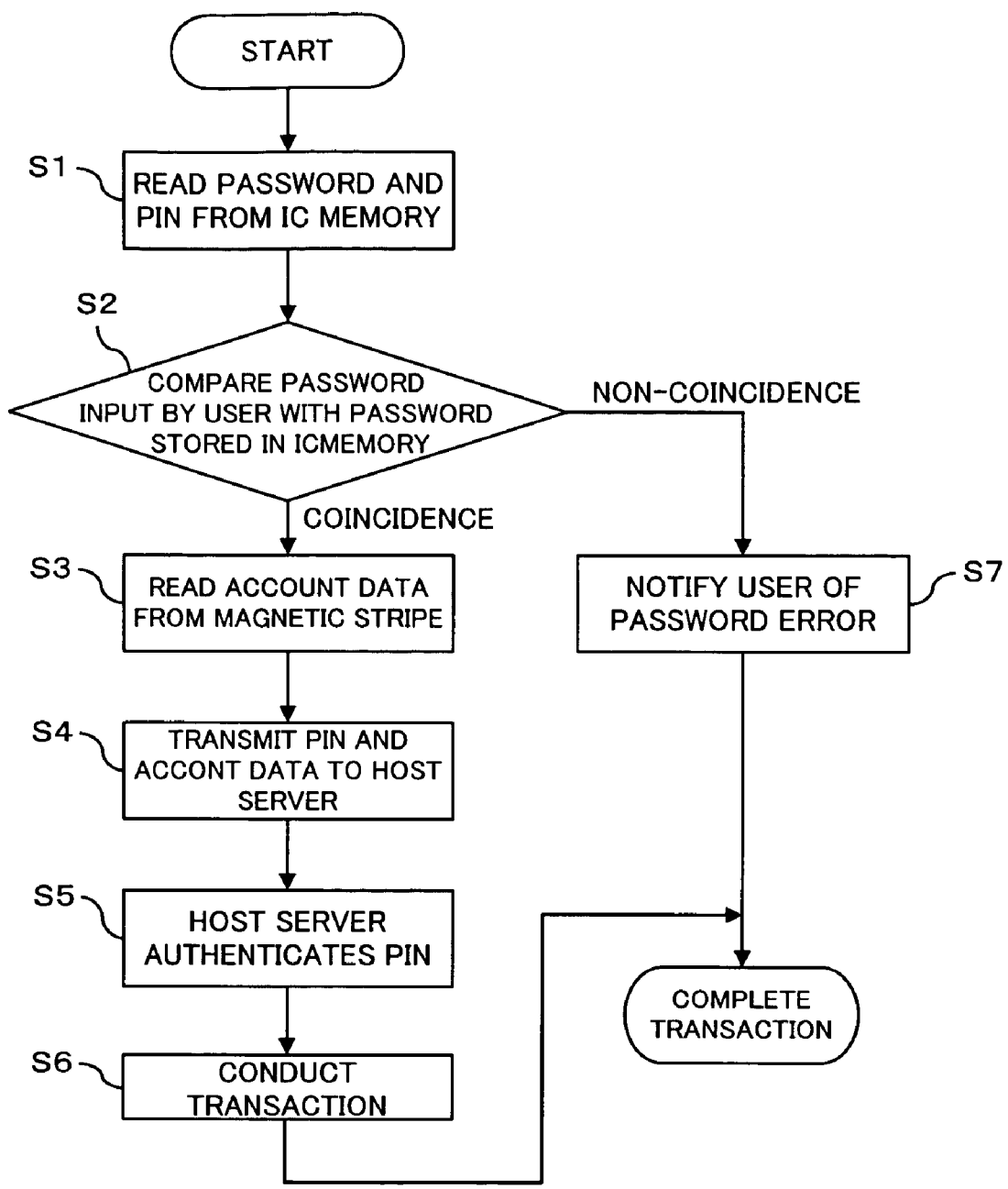
FIG. 3 is a flowchart for describing the first operation example of the first embodiment.

The IC card authentication terminal 20 reads a password PW2 and a PIN from the IC memory 12 of the IC card 10 by means of the memory reader 22 (step S1 in FIG. 3). The password authentication section 27 compares the two passwords PW1 and PW2 with each other, thereby determining whether or not a coincidence exists between them (step S2 shown in FIG. 3). A result of comparison is reported to the IC card authentication terminal control section 21. When a mismatch exists between the passwords PW1 and PW2 (a route designated by "NON-COINCIDENCE" of step S2), a notification to this effect (an error) is sent to the IC card authentication terminal control section 21 from the password authentication section 27 and is displayed on the display section 26 by means of the IC card authentication terminal control section 21, thereby prompting the user to again conduct the transaction and terminating processing (step S7 shown in FIG. 3).

When the passwords PW1 and PW2 coincide with each other (a route designated by "COINCIDENCE" of step S2), the person who has input the password is authenticated as the true user (holder) of the IC card 10. As shown in FIGS. 1 and 2, the magnetic stripe reader 24 reads the account data pertaining to the user from the magnetic stripe 11 on the IC card 10 (step S3 in FIG. 3), and the PIN and the account data are transmitted to the host server 30 from the network communications section 29 by way of the network 51 (step S4 in FIG. 3).

In the embodiment, as shown in FIG. 2, when the two passwords PW1 and PW2 coincide with each other, the password authentication section 27 outputs a transmission authorization signal to the network communication section 29 by way of the IC card authentication terminal control section 21. Upon receipt of the transmission authorization signal, the network communications section 29 transmits the PIN and the account data to the host server 30. Accordingly, the magnetic stripe reader 24 may read the account data (step S4 in FIG. 3) not after the password authentication section 27 has authenticated the user, but essentially concurrently with insertion of the IC card 10 (concurrently with step S1).

In principle, the host server 30 performs authentication and a transaction essentially as before. Specifically, after the host server 30 has received the account data and the PIN from the IC card authentication terminal 20 by way of the network communications section 32, the account authentication section 34 refers to the customer database 33 on the basis of the received account data, thereby extracting a PIN and a status, both pertaining to the user, from the customer database 33. The account authentication section 34 determines whether or not the account of object is compatible with conducting a transaction, by reference to the status and compares the PIN read from the customer database 33 with the PIN received by the network communications section 32, thereby authenticating the user (step S5 in FIG. 3).

After the account authentication section 34 has authenticated the user as a true user as a result of the two PINs coinciding with each other while the account of object is found to be compatible with conducting a transaction, a notification to this effect (a transaction authorization) is sent to the host server control section 31, whereupon the transaction is initiated/conducted (step S6 in FIG. 3). At this time, the transaction authorization notification is sent to the IC card authentication terminal 20, as well, and the notification to this effect is displayed as guidance on the display section 26. Subsequently, the user selects details of the transaction, or the like, by reference to the guidance on the display section 26, and inputs the details by way of the input section 25. As shown in FIG. 1, in relation to the details of transaction selected by the user, details of desired transaction or the like are transmitted to the host server 30 and reported to the transaction control section 35, so that the transaction is conducted. When the account is not compatible with conducting a transaction or when a mismatch exists between the PINs, a notification to this effect (a transaction denial) is sent to the IC card authentication terminal 20, and processing is terminated without commencing the transaction.

As mentioned previously, in the embodiment, after the user of the IC card 10 has been authenticated by means of the IC card authentication terminal 20, existing authentication data for transaction (i.e., a PIN of four digits) are sent to the host server 30 from the IC card authentication terminal 20. The host server 30 performs authentication through use of the PIN, which has hitherto been performed. Specifically, both the IC card authentication terminal 20 and the host server 30 authenticate (the user of) the IC card 10.

At this time, as shown in FIG. 2, the data transmitted from the IC card authentication terminal 20 to the host server 30 are made identical with those transmitted from the conventional card authentication terminal 20A to the host server 30. As a result, the conventional card authentication terminal 20A and the IC card authentication terminal 20 of the present embodiment can be mixedly connected to the existing host server 30. Namely, processing to be performed by the host server 30 remains unchanged regardless of whether the host server is compatible with the IC card authentication terminal 20 or the conventional card authentication terminal 20A.

The PIN transmitted from the conventional card authentication terminal 20A is manually input by the user, whereas the PIN transmitted from the IC card authentication terminal 20 of the embodiment is previously stored in the IC memory 12 of the IC card 10. Accordingly, occurrence of a mismatch between the two PINs to be compared by the account authentication section 34 is impossible, thereby obviating a necessity to compare the PINs with each other.

However, as shown in FIG. 2, under the circumstance where the conventional card authentication terminal 20A and the IC card authentication terminal 20 of the embodiment are mixedly connected to the host server 30, if the account authentication section 34 authenticates the PIN transmitted from the conventional card authentication terminal 20A and does not authenticate the PIN transmitted from the IC card authentication terminal 20, there will arise a necessity for the host server 30 to change the software relevant to the PIN authentication processing. Since successful authentication of the PIN transmitted from the IC card authentication terminal 20 is inevitable, no problem arises even when the authentication is carried out. For this reason, authentication of the PIN transmitted from the IC card authentication terminal 20 is carried out in the same manner as is authentication of the PIN transmitted from the conventional card authentication terminal 20A, whereby the present embodiment yields an effect of eliminating the need for the host server 30 to change existing software.

In the embodiment, the host server 30 sets a password (pass-phrase) different from an existing PIN without changing the software related to the PIN authentication processing, thereby effecting authentication through use of the password. Specifically, in addition to authentication which is performed through use of a conventional PIN (four digits), a character string—which differs in format from the PIN and is formed from, e.g., alphanumeric characters, Japanese Hiragana, Japanese Katakana, Chinese characters, or symbols—can also be used as a password at the time of authentication of the user. If such a password of arbitrary characters is used, a security characteristic, which is more enhanced as compared with that achieved as a result of use of a conventional PIN of four digits, can be ensured.

Use of a password of arbitrary letters results in an increase in the volume of data the user must memorize (i.e., the number of letters) as compared with a case where a PIN is used. However, even when a phrase easy for the user to memorize (e.g., "this is the year of my college graduation") or a simple substitution (e.g., MURASHITA in Roman letters are replaced with <ITSDJOYS created by typing letters located on the right of the respective letters in a keyboard layout) is used as a password, the third party encounters difficulty in inferring the password. Therefore, use of a password of arbitrary letters results in a significant increase in security level and the ability to set a password that is easy to memorize.

Figure 6:
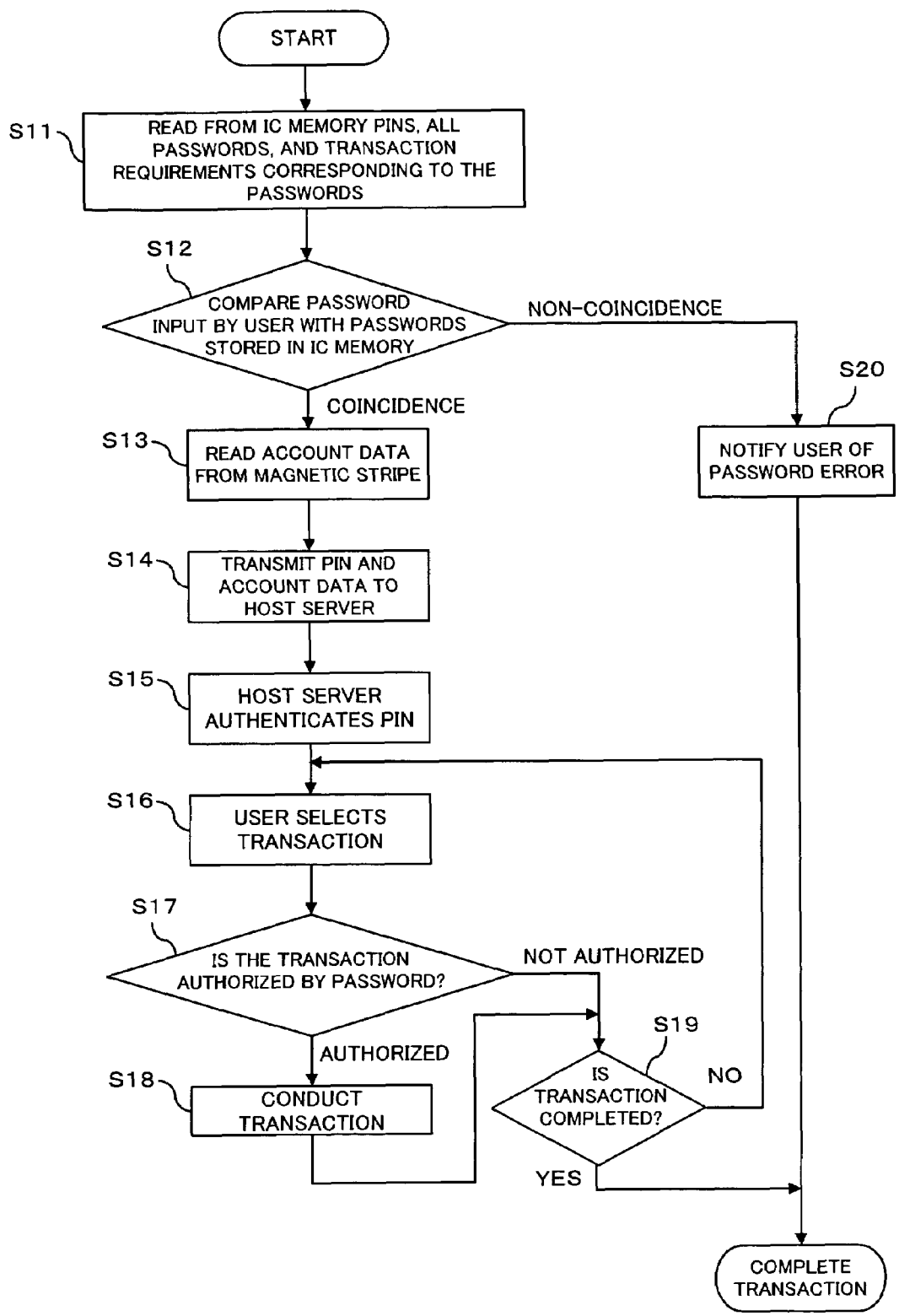
FIG. 6 is a flowchart for describing the second operation example of the first embodiment.

Next, a second operation example (transaction limitation operation) of the transaction system of the first embodiment will be described by reference to FIG. 1 and FIGS. 4 through 6. FIG. 4 is a view showing an example password and example transaction requirements, both pertaining to the first embodiment; FIG. 5 is a view for describing the second operation example of the transaction system; and FIG. 6 is a flowchart (steps S11 to S20) for describing the second operation example of the transaction system.

One account usually corresponds to one settlement card, and a transaction using the settlement card is conducted in connection with the account. For instance, in the case of a bank-based cash card, transactions, such as depositing money in one account, withdrawals up to a balance on the account, money transfer, and an inquiry about a balance on the account, can be conducted through use of one card. However, in the case of a conventional transaction system, when a plurality of users (e.g., family members) use a single account, no limitations can be imposed on details of transactions on a per-user basis.

For this reason, in the transaction system of the first embodiment, a plurality of (four in FIG. 4) passwords and transaction requirements (user limitation data) corresponding to the respective passwords are stored in advance in the IC memory 12 of the IC card 10, as shown in FIG. 4. As a result, one account is shared among a plurality of users, so that limitations can be imposed on details of a transaction on a per-user basis.

For instance, when a settlement card (the IC card 10) is shared among four family members; e.g., a father, a mother, an elder brother, and an elder sister, passwords 1 through 4 and transaction requirements corresponding to the respective passwords 1 to 4 are set in the IC memory 12, as shown in FIG. 4. So long as only a password 2, a password 3, and a password 4 have been given to the mother, the elder brother, and the elder sister, the single account (the single IC card 10) can be shared among all of the family members, and limitations can be imposed on details of transactions for each family member.

For instance, authorization and denial of various transactions (an inquiry about a balance on an account, a deposit, a withdrawal, a money transfer, a time deposit, and changes in settings) are set as transaction requirements, and the amount of withdrawable money is set at the time of authorization of a withdrawal. In the embodiment shown in FIG. 4, no limitations are imposed on the amount of money the father can withdraw (a balance on the account); the amount of money the mother can withdraw is set to 100,000 yen; the amount of money the elder brother an withdraw is set to 10,000 yen; and the amount of money the elder sister can withdraw is set to 5,000 yen. At this time, the amount of withdrawable money may be set as the amount of money per transaction or the amount of money which can be withdrawn during a certain period of time (e.g., one month). A specific example of the latter case (when the amount of money which can be withdrawn during a certain period of time is set) will be described later by reference to FIG. 8.

By reference to FIGS. 1, 5, and 6, there will now be described transaction processing procedures required when a plurality of passwords and transaction requirements corresponding to the respective passwords are set in the IC memory 12 of the IC card 10 as mentioned previously.

When the user inserts the IC card 10 into the IC card authentication terminal 20 on occasion of initiation of the transaction involving usage of the IC card 10 by means of the IC card authentication terminal 20, the IC card authentication terminal control section 21 displays guidance on the display section 26, thereby prompting the user to input a password. As shown in FIGS. 1 and 5, the user inputs a password for authentication from the input section 25 in accordance with the guidance.

The IC card authentication terminal 20 reads all of the passwords and transaction requirements set for the respective passwords from the IC memory 12 of the IC card 10, along with the PINs, by means of the memory reader 22 (step S11 in FIG. 6). When the plurality of passwords have been read from the IC memory 12 in the manner mentioned previously, the password authentication section 27 compares the password input from the input section 25 with the plurality of passwords read from the IC memory 12, thereby determining whether or not the input password coincides with any one of the plurality of passwords (step S12 in FIG. 6). A result of determination is reported to the IC card authentication terminal control section 21.

When the input password does not coincide with any of the plurality of passwords (a route designated by "NON-COINCIDENCE" of step S12), a notification to this effect (an error) is sent to the IC card authentication terminal control section 21 from the password authentication section 27 and is displayed on the display section 26 by means of the IC card authentication terminal control section 21, thereby prompting the user to again conduct the transaction and terminating processing (step S20).

When a password coinciding with the input password is found (a route designated by "COINCIDENCE" of step S12), the person who has input the password is considered to have been authenticated as one of the users. As shown in FIGS. 1 and 5, the magnetic stripe reader 24 reads the account data pertaining to the user from the magnetic stripe 11 on the IC card 10 in the same manner as in the procedures described by reference to FIGS. 2 and 3 (step S13 in FIG. 6), and the PIN and the account data are transmitted to the host server 30 from the network communications section 29 to the network 51 (step S14 in FIG. 6).

Subsequently, the host server 30 authenticates the PIN in the same manner as in step S5 shown in FIG. 3 (step S15 in FIG. 6). When the account authentication section 34 has authenticated that the account—which is an object of transaction—is compatible with conducting a transaction and that the user is authenticated as a result of occurrence of a coincidence between the previously-described two PINs, a notification to this effect (transaction authorization) is sent to the host server control section 31. The notification is sent to the IC card authentication terminal 20 from the host server control section 31 by way of the network communications section 32 and the network 51, thereby commencing a transaction.

When the IC card authentication terminal 20 has received the transaction authorization notification from the host server 30, the user selects details of a transaction by reference to the guidance on the display section 26 and inputs the details by way of the input section 25 (step S16 in FIG. 6).

At this time, only details of the transaction (service) allowed by the transaction requirements corresponding to the input password (the user corresponding to the person who has input the password) are displayed in the form of menus on the display section 26, thereby causing the user to select details of transaction from the allowed services. In this case, the amount of withdrawable money may also be displayed. In addition, the transaction control section 28 may make a determination as to whether or not details of the transaction input by the user satisfy the transaction requirements corresponding to the user, without displaying the authorization services such as those mentioned previously. Only when the transaction requirements are satisfied, the transaction may be authorized. Moreover, when the authorization services such as those mentioned previously are displayed and when the details of the transaction indicate a withdrawal, the transaction control section 28 may determine whether or not the amount of withdrawal designated by the user is less than or equal to the amount of withdrawable money. In any event, in the embodiment, display of the authorization services and a determination as to transaction requirements to be performed by the transaction control section 28 are carried out by the IC card authentication terminal 20, thereby limiting the details of the user's transaction within the range set by the transaction requirements.

For instance, the four passwords 1 through 4 shown in FIG. 4 are stored in the IC memory 12. When the password input by the user is a password 2, a notification indicating authorization of the "inquiry about a balance on the account," "a deposit," "a withdrawal (a ceiling of 100,000 yen)," and "money transfer" is transmitted to the IC card authorization terminal control section 21. After the host server 30 has performed authorization, the IC card authorization terminal control section 21 causes the display section 26 to display a list of implementable services (i.e., "Inquiry about a balance on the account," "Deposit," "Withdrawal," and "Money Transfer"), thereby prompting the user to select any one of these (step S16 in FIG. 6). As mentioned previously, all transactions may be displayed, and the transaction control section 28 may be caused to determine whether or not details of the transactions selected by the user are authorized.

When the user has selected "Withdrawal," the user inputs the amount of withdrawal (step S16 in FIG. 6). The transaction control section 28 determines whether or not the amount of withdrawal input by the user coincides with the transaction requirements (the amount of withdrawable money) (step S17 in FIG. 6). When the input amount of money has surpassed the amount of withdrawable money (a route designated by "NOT AUTHORIZED" in step S17), the transaction control section 28 does not accept the current transaction. At this time, the IC card authentication terminal control section 21 causes the display section 26 to display a notification to this effect, thereby notifying the user to re-enter details of a transaction. When the transaction is continued in accordance with this notification (a route designated by selecting NO in step S19 in FIG. 6), the user again selects details of the transaction (step S16 in FIG. 6). When the transaction is not continued (a route designated by selecting YES in step S19 in FIG. 6), processing is terminated.

When the amount input by the user is equal to or less than the amount of withdrawable money (a route designated by "AUTHORIZED" of step S17), the transaction request (details of a transaction) of the user are transmitted in their present forms to the host server 30. Subsequently, the host server 30 operates in completely the same manner as in a case where the transaction request output from the conventional card authentication terminal 20A (see FIG. 2) is handled, whereupon the transaction complying with the transaction request from the IC card authentication terminal 20 is conducted (step S18 in FIG. 6). When another transaction is conducted after completion of the current transaction (a route designated by selecting NO in step S19 in FIG. 6), the user re-selects details of the transaction (step S16 in FIG. 6). When another transaction is not conducted (a route designated by selecting YES in step S19 in FIG. 6), processing is terminated.

As mentioned above, the plurality of passwords and the transaction requirements corresponding to the respective passwords are stored in the IC memory 12, whereby the plurality of users can share a single account, and an individual service can be provided on a per-user basis. At this time, a determination as to limitations on the user (a determination as to whether or not the details of the transaction satisfy the transaction requirements) is made by the IC card authentication terminal 20. Hence, there is obviated a necessity for making a change in the host server 30 in order to make the determination. The functions described by reference to FIGS. 4 to 6 can be fulfilled at low cost.

In the embodiment shown in FIG. 4, the password 1 indicating authority to change settings is authenticated at the window of the bank, whereby the passwords and the transaction requirements, both being stored in the IC memory 12, can be changed. In the transaction system shown in FIG. 1, the IC card authentication terminal 20 is provided with the memory writer 23. Hence, the password or the transaction requirements can also be changed through use of the memory writer 23. By reference to FIGS. 9 and 10, there will be described later subsequent procedures required when a request to change the password or the transaction requirements is issued from the user terminal 40 to the host server 30 and when the changes are made by the memory writer 23 of the IC card authentication terminal 20 in accordance with the request to change.

Figure 7:
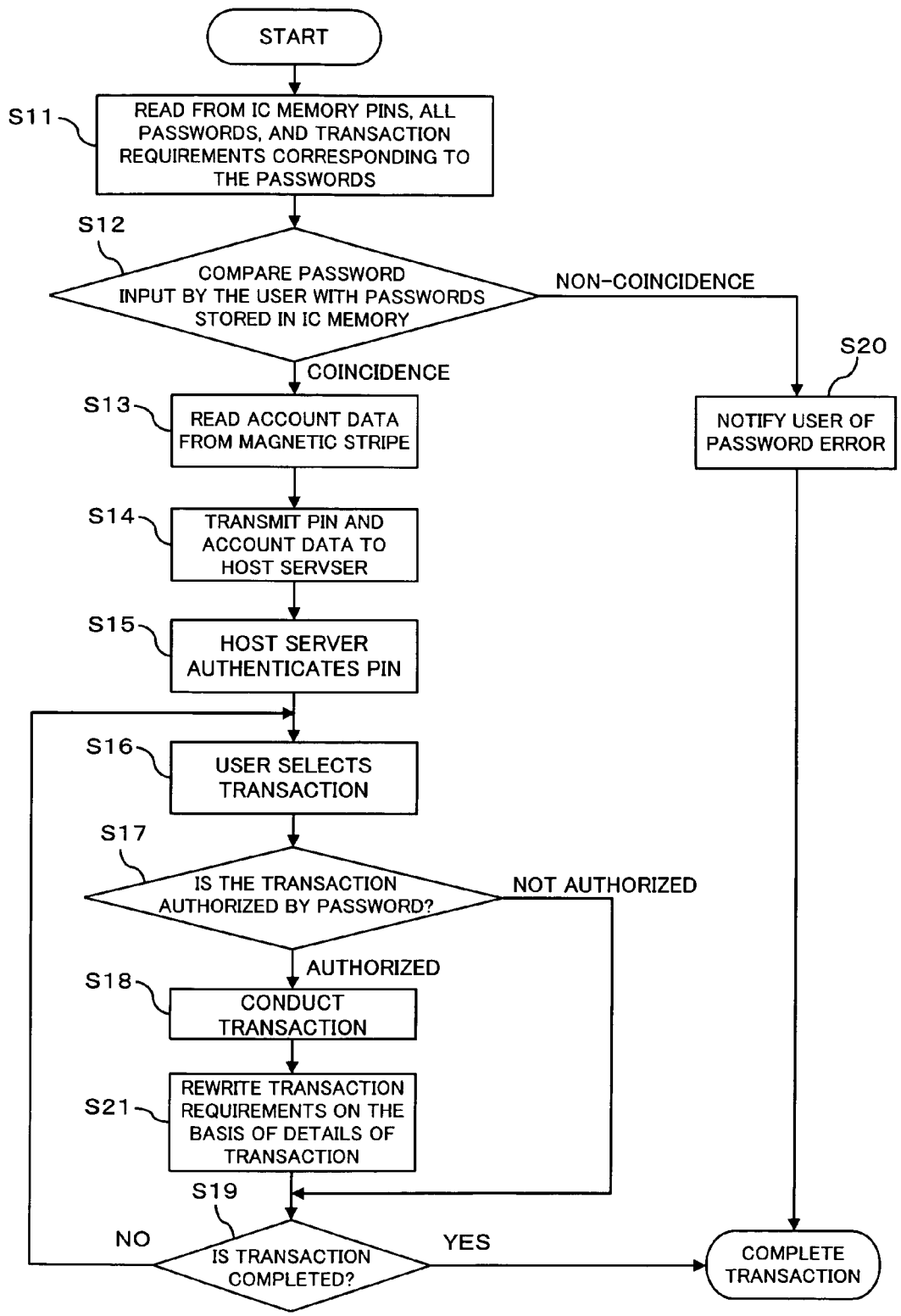
FIG. 7 is a flowchart for describing a third operation example of the first embodiment.

Next, a third operation example (a transaction requirement rewriting operation) of the transaction system according to the first embodiment will be described by reference to FIG. 7. FIG. 7 is a flowchart (steps S11 to S21) for describing the third example. In FIG. 7, steps S11 to S20 are the same as those described by reference to FIG. 6, and hence their repeated explanations are omitted. The flowchart shown in FIG. 7 differs from that shown in FIG. 6 only in that new step S21 is added between steps S18 and S19.

Even in the third operation example, the plurality of passwords and the transaction requirements corresponding to the respective passwords are stored in the IC memory 12 of the IC card 10. In the third example, when the amount of withdrawable money and the number of times a transaction can be conducted are set as transaction requirements, limitations corresponding to the past transaction can be added by means of rewriting the transaction requirements after completion of the transaction. Specifically, as shown in FIG. 7, when the transaction is completed in step S18, the memory writer 23 rewrites, in step S21, the transaction requirements in the IC memory 12 of the IC card 10 on the basis of the result of transaction (details of the transaction) conducted by the host server 30.

For instance, under the situation where the "Amount of withdrawable money: 100,000 yen" is set as transaction requirements for one (user 1) of the plurality of users, when the user 1 conducts a transaction for withdrawing 50,000 yen, the memory writer 23 of the IC card authentication terminal 20 rewrites the "Amount of withdrawable money: 100,000 yen" to the "Amount of withdrawable money: 50,000 yen" at the time of completion of the transaction. When the current transaction is a withdrawal of 100,000 yen, the amount of withdrawable money becomes 0. Hence, "Withdrawal denial" and the "Amount of withdrawable money is 0 yen" are written as new transaction requirements.

As mentioned above, a transaction complying with the past transaction can be conducted by means of updating the transaction requirements in accordance with the details of the transaction. Even in this case, all of the transaction requirement rewriting processing operations are performed by the IC card authentication terminal 20, and hence the host server 30 does not need to make any special change for rewriting the transaction requirements.

Figure 8:
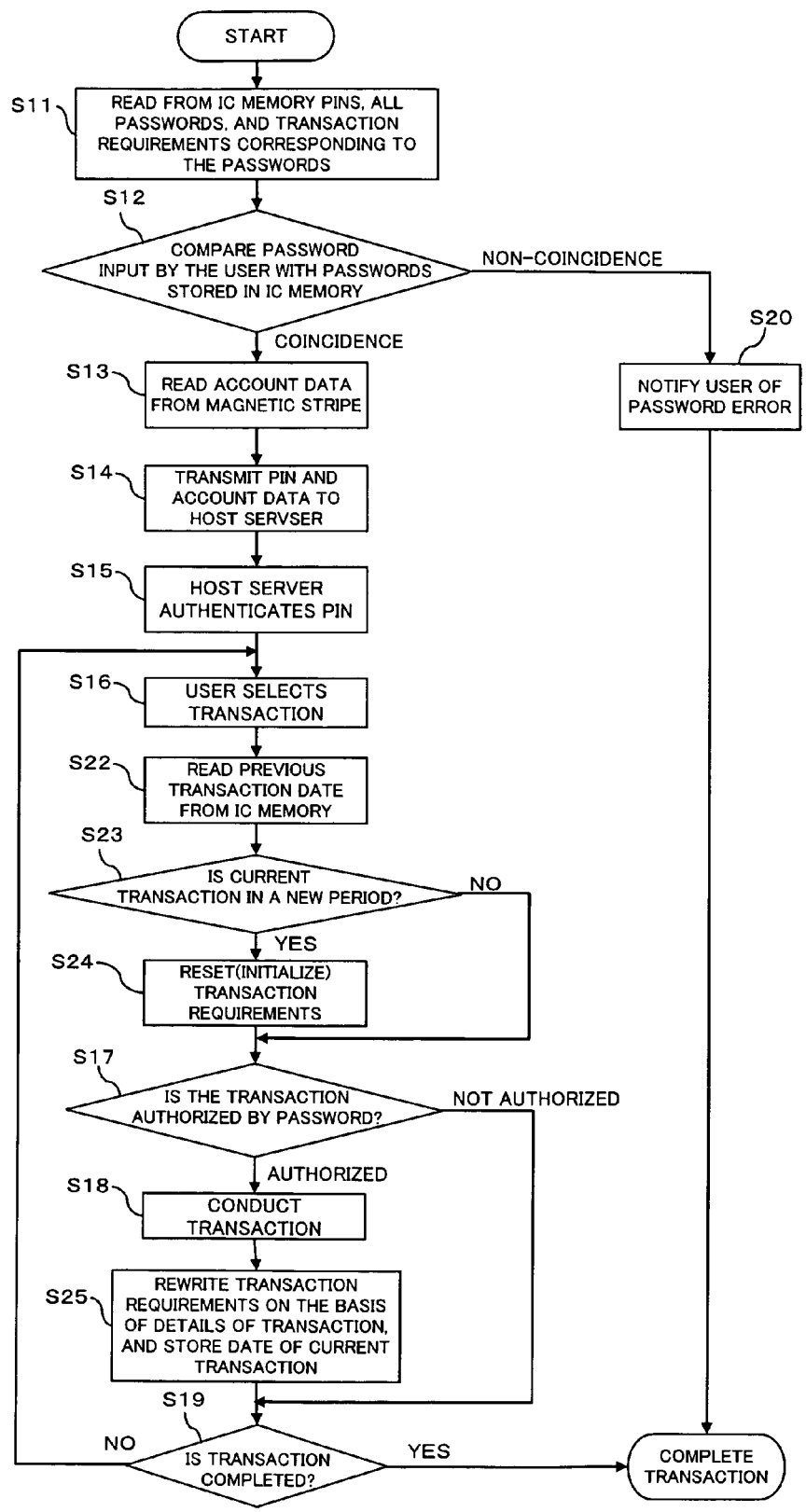
FIG. 8 is a flowchart for describing a fourth operation example of the first embodiment.

A fourth operation example (a transaction requirement rewriting operation) of the transaction system of the first embodiment will now be described by reference to FIG. 8. FIG. 8 is a flowchart (steps S11 to S20 and S22 to S25) for describing the fourth operation example. In FIG. 8, steps S11 to S20 are the same as those described by reference to FIG. 6, and their repeated explanations are omitted. The flowchart shown in FIG. 8 differs from that shown in FIG. 6 in that new steps S22 to S24 are added between steps S16 and S17 and in that a new step S25 is added between steps S18 and S19.

Even in the fourth operation example, the plurality of passwords and the transaction requirements corresponding to the respective passwords are stored in the IC memory 12 of the IC card 10. In the fourth operation example, a period of time—during which utilization of the amount of withdrawable money and the number of times a transaction can be conducted are authorized (a reset timing: e.g., every month)—is set along with the amount of withdrawable money and the number of times a transaction can be conducted as in the case of the third operation example, and a limitation complying with the past transaction can be added by means of rewriting the transaction requirements after completion of the transaction, whereby the transaction requirements are reset every predetermined period in accordance with initial requirements.

Specifically, in the fourth operation example, when the transaction using the IC card 10 is conducted first after the reset timing, the memory writer 23 resets the transaction requirements in the IC memory 12 of the IC card 10 in accordance with the initial requirements. In the fourth operation example, a date at which the transaction is conducted are written into the IC memory 12 of the IC card 10 at the time of completion of the transaction by means of the memory writer 23. Initial values (initial requirements) of the transaction requirements other than the transaction requirements are stored in advance in the IC memory 12.

To be more specific, as shown in FIG. 8, when the user has selected details of the transaction in step S16, the memory reader 22 reads the date of the previous transaction from the IC memory 12 (step S22), and the IC card authentication terminal control section 21 or the transaction control section 28 determines whether the date of the current transaction falls within a new period of time or the date of the previous transaction is prior to the current period (step S23).

When the date of the current transaction is in a new period (a route designated by selecting YES in step S23), the transaction requirements are reset (initialized) in accordance with the initial requirements (step S24), and processing proceeds to step S17. When the date of current transaction is not within the new period (a route designated by selecting NO in step S23), processing proceeds to step S17 without resetting the transaction requirements.

When the transaction is completed in step S18, the memory writer 23 rewrites the transaction requirements in the IC memory 12 of the IC card 10 in the same manner as in the third operation example, on the basis of the result of transaction (details of the transaction) conducted by the host server 30. In the fourth operation example, the date at which the transaction is conducted is written into the IC memory 12 (step S25).

For instance, under the situation where the Amount of withdrawable money: 100,000 yen" and the "Period: every month" are set as transaction requirements for one (user 1) of the plurality of users, when the user 1 conducts a transaction for withdrawing 50,000 yen, the memory writer 23 of the IC card authentication terminal 20 rewrites the "Amount of withdrawable money: 100,000 yen" to the "Amount of withdrawable money: 50,000 yen" at the time of completion of the transaction. In the fourth operation example, the date of the previous transaction is written in the IC memory 12, and the date of the previous transaction is compared with the date of the current transaction at the commencement of the transaction.

When the date of the previous transaction and the date of the current transaction belong to different respective "periods" (e.g., when a "period" of the transaction requirement is "every month," the date of the previous transaction belongs to January, and the date of the current transaction belongs to February), the transaction requirements (the amount of withdrawable money in the present embodiment) stored in the IC memory 12 are reset (initialized) in accordance with the initial requirements (an initial value of 100,000 yen) stored in the IC memory 12. Subsequently, the transaction is conducted in accordance with the reset transaction requirements.

As a result, even in the circumstance where the maximum amount of withdrawable money has been withdrawn in the previous month and when the transaction requirements are set to "Withdrawal denial," "Amount of withdrawable money: 0 yen," and "Period: every month," the transaction requirements are reset to the initial requirements "Withdrawal authorization," "Amount of withdrawable money: 100,000 yen," and "Period: every month," and the transaction is commenced, so long as the date of the previous transaction and the date of the current transaction belong to different periods of dates.

Even in the fourth operation example, all of the transaction requirement rewrite processing operations are performed by the IC card authentication terminal 20, and hence the host server 30 does not need to make any special changes in order to rewrite the transaction requirements.

In addition to including a technique for rewriting (initializing) the amount of withdrawable money to an initial value (100,000 yen), a conceivable technique for resetting the amount of withdrawable money also includes a technique for setting, as the amount of withdrawable money, the amount of money determined by adding the balance to the initial value (100,000 yen). In a case where the latter technique is adopted, if 30,000 yen is left as the amount of withdrawable money as a result of withdrawal of 70,000 yen in the previous month, the amount of 130,000 yen derived from addition (accumulation) of a balance of 30,000 yen in the previous month to an initial value of 100,000 yen is set as the amount of withdrawable money for a new month rather than the amount of withdrawable money being reset to 100,000 yen. In this case, when the date is determined as a new "period" (month) at the commencement of the transaction, the memory writer 23 writes the "Amount of withdrawable money: 130,000 yen"

and the "Period: every month" are written as transaction requirements in the IC memory 12.

Figure 9:
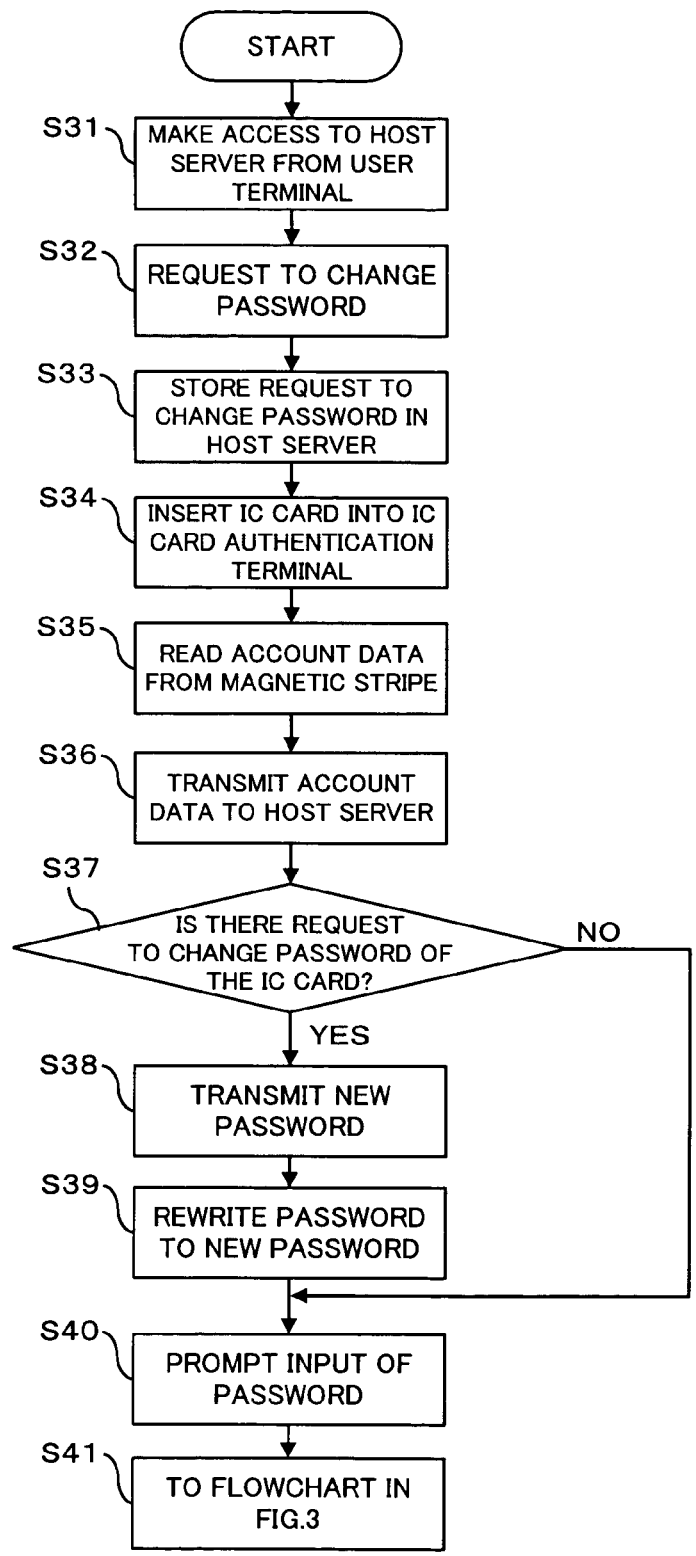
FIG. 9 is a flowchart for describing a fifth operation example of the first embodiment.
Figure 10:
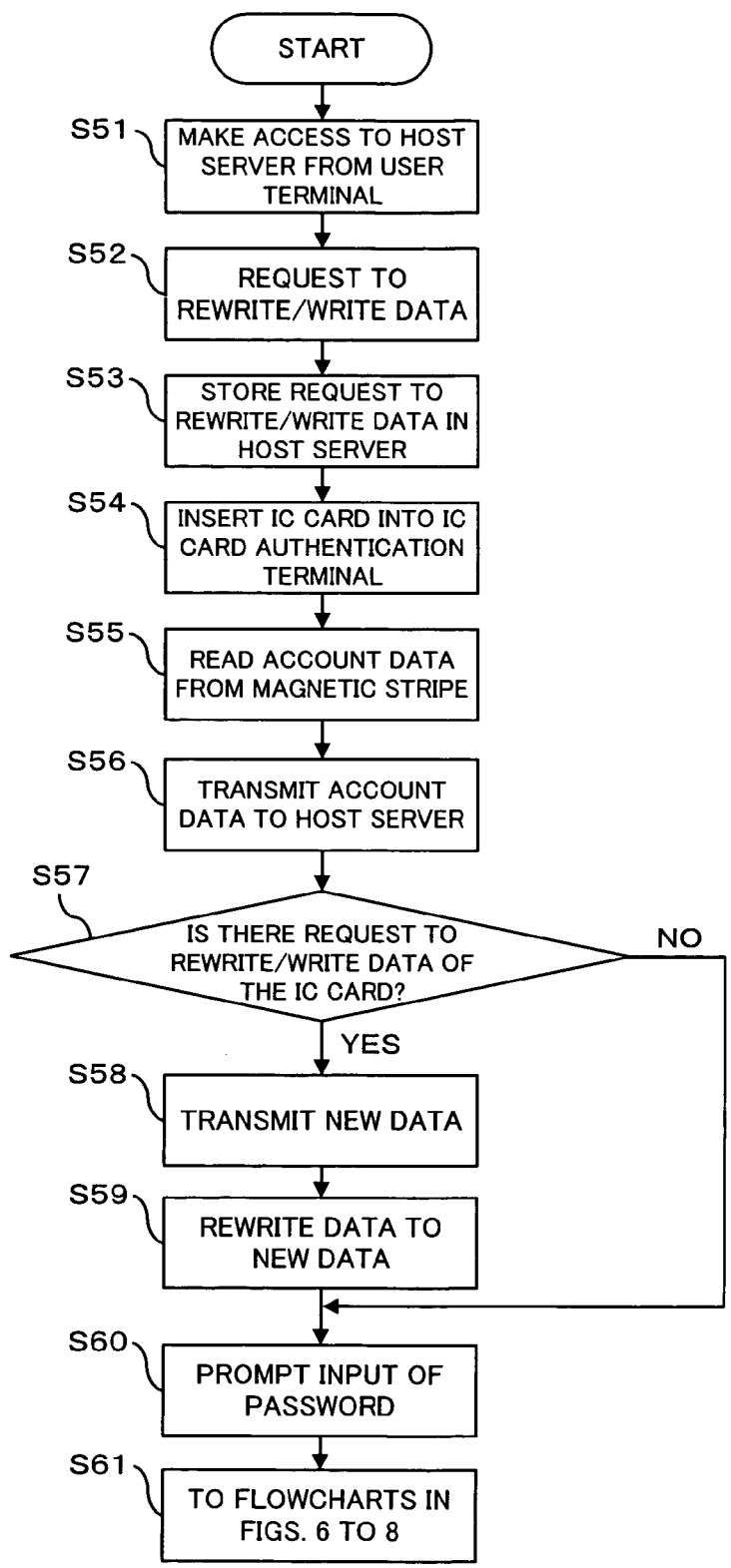
FIG. 10 is a flowchart for describing a sixth operation example of the first embodiment.

Next, a fifth operation example (an operation during which the user rewrites a password) and a sixth operation example (an operation during which the user rewrites transaction requirements or the like) of the transaction system according to the first embodiment will now be described by reference to FIGS. 9 and 10. FIG. 9 is a flowchart (steps S31 to S41) for describing the fifth operation example of the transaction system. FIG. 10 is a flowchart (steps S51 to S61) for describing a sixth operation example.

The Internet has become proliferate nowadays, and various services can be offered in the home or office by way of the Internet. As shown in FIG. 1, in the transaction system of the present embodiment, the host server 30 is connected to the user terminal 40 disposed in a home or office in a communicable manner by way of a network (e.g., the Internet) 52. The user has an environment in which the user can refer to the history of transactions conducted through use of the IC card 10, by means of making an access to the host server 30 from the user terminal 40 or conduct a transaction such as Internet banking.

In order to maintain high security, the password registered in the IC card 10 can preferably be changed whenever the user desires the change. However, in order to change the data in the IC memory 12, a memory writing device (a memory writer) is usually required. If the user owns the memory writer, costs borne by the user will become large, and hence possession of the memory writer is not realistic. It is also conceivable that the company of settlement cards, such as a bank or a credit loan company, lends users memory writers. However, costs borne by the company become great, and hence such an arrangement is not preferable. The password can be changed, so long as the memory writer 23 in the IC card authentication terminal 20 is used. However, in this case, the user must go to the location where the IC card authentication terminal 20 is installed, and hence the user cannot change the password "when desired by the user".

Therefore, the fifth and sixth operation examples are cases where the password (the fifth operation example) and the transaction requirements, or the like, (the sixth operation example) are changed or rewritten substantially "when desired by the user" through use of the recently attained Internet environment and the memory writer 23 in the IC card authentication terminal 20.

The host server 30 of the embodiment is configured to issue, to the IC card authentication terminal 20, a command for rewriting the data in the IC memory 12 of the IC card 10 and a command for writing new data into the IC memory 12 when a transaction is conducted through use of the IC card 10.

Specifically, when the user has issued a (change) request to write data or to rewrite the data in the IC memory 12 of the IC card 10 of the user by way of the user terminal 40, the request is received by the network server 36 of the host server 30, and the request and the data to be written/rewritten are stored in the user request storage section 38. When the user conducts a transaction through use of the IC card 10 by way of the IC card authentication terminal 20 after receipt of the request, the host server 30 perceives that the writing/rewriting request pertaining to the IC card 10 is saved in the user request storage section 38. The memory writer 23 of the IC card authentication terminal 20 subjects the IC memory 12 of the IC card 10 to writing or rewriting operation corresponding to the request.

As does the first operation example, the fifth operation example describes a case where only one password is stored in the IC memory 12 of the IC card 10 and an object to be written/rewritten is the password. As do the second through fourth operation examples, the sixth operation example describes a case where a plurality of passwords and transaction requirements corresponding to the respective passwords are stored in the IC memory 12 of the IC card 10 and objects to be written/rewritten are a password and transaction requirements, or the like [may also be an electronic mail address of the user or data (account data or like) pertaining to a transaction counterpart of the user].

As shown in FIG. 9, in the fifth operation example, when the user desires to change the password of the IC card 10 of the user, the user accesses the host server 30 from the input section 43 of the user terminal 40 by way of the network 52 (step S31) to request the host server 30 to change the password (step S32). In the host server 30, when the network server 36 has received the user's request, the request to change the password (a request to rewrite) and data to be rewritten (a new password) are stored in the user request storage section 38 in association with data (e.g., an account number) which enable specification of the IC card 10 of the user (step S33). In this step, as a matter of course the password data in the IC memory 12 of the IC card 10 owned by the user still remain unchanged.

When the user inserts, at later date, the IC card 10 into the IC card authentication terminal to conduct a transaction using the IC card 10 by way of the IC card authentication terminal 20 (step S34), the IC card authentication terminal 20 sends a notification indicating utilization of the IC card 10 to the host server 30 prior to authentication of the IC card 10. At this time, the magnetic stripe reader 24 reads the account data pertaining to the user from the magnetic stripe 11 on the IC card 10 (step S35) and transmits the account data to the host server 30 from the network communications section 29 by way of the network 51 (step S36).

While taking as a cue the account number included in the account data, the host server 30 having received the account data determines whether or not the request corresponding to the account number is stored in the user request storage section 38; that is, whether or not the request to change the password of the IC card 10 which is about to be used for conducting a transaction is stored (step S37). When the request to change the password of the IC card 10 is stored (a route designated by selecting YES in step S37), a new password is transmitted from the host server 30 to the IC card authentication terminal 20 along with the request (step S38), whereupon the password in the IC memory 12 of the IC card 10 is rewritten to the new password by means of the memory writer 23 (step S39). Subsequently, the IC card authentication terminal 20 prompts the user to input a password through the display section 26 (step S40).

When the request to change the password of the IC card 10 is not stored (a route designated by selecting NO in step S37), a notification to this effect is sent from the host server 30 to the IC card authentication terminal 20, thereby prompting the user to input a password by way of the display section 26 (step S40).

When the user has input the password from the input section 25, an authentication or a transaction is carried out through the same procedures as those of the flowchart shown in FIG. 3 (step S41). In the fifth operation example, since the account data have already been read in step S35, processing pertaining to step S3 in FIG. 3 can be omitted.

Therefore, in the fifth operation example, when the request to change a password has been issued by way of the user terminal 40, the password is changed prior to authentication of the password. The IC card authentication terminal 20 authenticates the card through use of the new password, whereby a transaction is commenced. As mentioned above, the password in the IC memory 12 is changed when the transaction is conducted through use of the IC card 10. However, the password is viewed as if it were changed when the user has issued the changing request from the user terminal 40. Thereby, the user can change the password substantially "when desired by the user" without holding a memory writer, or the like, in hand.

As shown in FIG. 10, in the sixth operation example, rewriting of all of the data in the IC memory 12 of the IC card 10 (e.g., data pertaining to transaction requirements, an electronic mail address of the user, and a transaction counterpart of the user) as well as the password and rewriting of new data into the IC memory 12 are also performed in the same manner as in the fifth operation example. Steps S51 to S61 in FIG. 10 correspond to steps S31 to S41 in FIG. 9.

Specifically, changing of the password or the transaction requirements in the IC memory 12 and writing of new data into the IC memory 12 are desired, the user accesses the host server 30 from the input section 43 of the user terminal 40 by way of the network 52 (step S51), thereby requesting the host server 30 to perform rewriting/writing operation (step S52). Upon receipt of the user's request by way of the network server 36, the host server 30 stores, in the user request storage section 38, the request to rewrite/write and data to be rewritten/written in association with the data (e.g., an account number) which enable specification of the IC card 10 of the user (step S53).

When the user inserts, at a later time, the IC card 10 into the IC card authentication terminal to conduct a transaction using the IC card 10 by way of the IC card authentication terminal 20 (step S54), the IC card authentication terminal 20 sends a notification indicating utilization of the IC card 10 to the host server 30 before authenticating the IC card 10. At this time, the magnetic stripe reader 24 reads the account data pertaining to the user from the magnetic stripe 11 on the IC card 10 (step S55) and transmits the account data to the host server 30 from the network communications section 29 by way of the network 51 (step S56).

While taking as a cue the account number included in the account data, the host server 30 having received the account data determines whether or not the request corresponding to the account number is stored in the user request storage section 38; that is, whether or not the request to change the IC card 10 which is about to be used for conducting a transaction is stored (step S57). When the request to change the IC card 10 is stored (a route designated by selecting YES in step S57), data to be rewritten/written are transmitted from the host server 30 to the IC card authentication terminal 20 along with the request (step S58), whereupon the data to be rewritten in the IC memory 12 of the IC card 10 are rewritten in accordance with the data for rewriting or new data are written into the IC memory 12 by means of the memory writer 23 (step S59). Subsequently, the IC card authentication terminal 20 prompts the user to input the password through the display section 26 (step S60).

When the rewriting/writing request pertaining to the IC card 10 is not stored (a route designated by selecting NO in step S57), a notification to this effect is sent from the host server 30 to the IC card authentication terminal 20, thereby prompting the user to input a password by way of the display section 26 (step S60).

When the user has input the password from the input section 25, an authentication or a transaction is carried out through the same procedures as those in any one of the flowcharts shown in FIGS. 6 through 8 (step S61). In the sixth operation example, since the account data have already been read in step S55, processing pertaining to step S13 in FIGS. 6 through 8 can be omitted.

Accordingly, in the sixth operation example, when the rewriting/writing request pertaining to the IC card 10 has been issued by way of the user terminal 40, rewriting/writing operation corresponding to the request is performed prior to authentication of the password. Subsequently, the IC card authentication terminal 20 authenticates the card, thereby commencing a transaction. As mentioned above, although rewriting/writing of data in the IC memory 12 is performed when the transaction using the IC card 10 is conducted, rewriting/writing operation is viewed as if it were performed when the user has issued a rewriting/writing request from the user terminal 40. Thereby, the user can change the data in the IC memory 12 substantially "when desired by the user" without holding a memory writer, or the like, in hand.

As mentioned above, the transaction system of the first embodiment yields the following working-effects.

(1) When the person who has input a password is authenticated as the user of the IC card 10, the account data read from the magnetic stripe 11 of the IC card 10 and the PIN read from the IC memory 12 are transmitted to the host server 30. The host server 30 conducts a transaction in accordance with these data sets. As a result, the IC card authentication terminal 20 compatible with the IC card 10 can be installed without changing the configuration of the host server 30. Specifically, the configuration of the host server 30 still remains identical with that of the conventional host server. Hence, as shown in FIG. 2, the transaction system of the present embodiment allows mixing of the IC card authentication terminal 20 of the embodiment and the conventional card authentication terminal 20A. When the system adopting the conventional settlement card is shifted to the system adopting the IC card 10, the entire system does not need to be collectively changed, and a shift from one system to another system can be performed at low cost. Consequently, the transaction system of the embodiment effectively functions at the time of the previously-described system shift, thereby greatly contributing to significant proliferation of the IC card 10.

(2) In the transaction system of the present embodiment, the memory writer 23 of the IC card authentication terminal 20 writes data into the IC memory 12 of the IC card 10 or rewrites the data recorded in the IC memory 12, at the time of conduction of a transaction. Specifically, the user can write data or rewrite the data in the IC memory 12 of the IC card 10 simultaneously when conducting a desired transaction by way of the IC card authentication terminal 20 without standing in a line in front of the ATM terminal or at a window for rewriting the data in the memory even when not having a special card writing device (IC card writer).

(3) In the transaction system of the present embodiment, the IC card authentication terminal 20 performs authentication through use of a password of arbitrary characters, thereby yielding an advantage of the ability to significantly improve a security level and set a password that is easy to memorize.

(4) The transaction requirements having been set in advance in connection with the user of the IC card 10 are recorded in the IC memory 12 of the IC card 10, and a transaction is conducted in accordance with the transaction requirements. As a result, details of a transaction which the user can conduct can be limited to a range set by the transaction requirements.

(5) Passwords of a plurality of users are recorded in the IC memory 12 of the IC card 10, and transaction requirements having been set in advance in connection with the respective users (e.g., the amounts of withdrawable money) are recorded in the same. When the password input by way of the input section 25 has coincided with any one of the plurality of passwords, the transaction is conducted in accordance with the transaction requirements corresponding to the user. Thereby, the plurality of users can share a single IC card 10; that is, the single account for transaction. Details of a transaction which the user can conduct (e.g., withdrawal of cash) can be limited to a range set by the transaction requirements (e.g., the amount of withdrawable money).

(6) When the transaction requirements are set in the IC memory 12 of the IC card 10, the transaction requirements can be updated in accordance with the details of a transaction on the basis of the result of the transaction conducted by the host server 30, by means of changing the transaction requirements in the IC memory 12 of the IC card 10 through use of the memory writer 23. At this time, the reset timing at which transaction requirements are to be reset and initial requirements of the transaction requirements has been set in advance. When a transaction using the IC card 10 is first conducted after the time of reset, the memory writer 23 resets the transaction requirements in the IC memory 12 of the IC card 10 in accordance with the initial requirements. As a result, the transaction requirements can be automatically rewritten to the initial requirements every predetermined period; e.g., the transaction requirements can be automatically rewritten so as to add (accumulate) the amount of withdrawable money to the amount of money set in accordance with the initial requirements. Since such rewriting of transaction requirements is automatically performed at the time of conduction of a transaction, the user does not need to issue a rewriting command, and no special attention for rewriting needs to be paid.

(7) Upon receipt of a writing/rewriting request pertaining to the IC memory 12 of the IC card 10, the host server 30 temporarily holds new data (e.g., a password, transaction requirements, an electronic mail address of the user of the IC card, data pertaining to a transaction counterpart of the user of the IC card, or the like) corresponding to the request. Subsequently, when a transaction is first conducted through use of the IC card 10 of interest, the memory writer 23 of the IC card authentication terminal 20 writes the new data into the IC memory 12 of the IC card 10, or rewrites the data stored in the memory to the new data. As a result, the data in the card can be written or rewritten as if at the user's desire, even when the user does not possess a special card writer or does not wait in a line in front of an ATM terminal or the window to rewrite data in the memory or the like.

(8) Data pertaining to a transaction counterpart of a user B (e.g., an account number to which money is to be transferred or the like) are changed or written into the IC memory 12 of the IC card 10 of the user B when a transaction is conducted through use of the IC card 10. When the transaction with the transaction counterpart is conducted next time through use of the IC card 10, input of data pertaining to the transaction counterpart becomes unnecessary, thereby simplifying an operation to be performed by the user B by way of the IC card authentication terminal 20.

[2] Descriptions of a Second Embodiment

Figure 11:
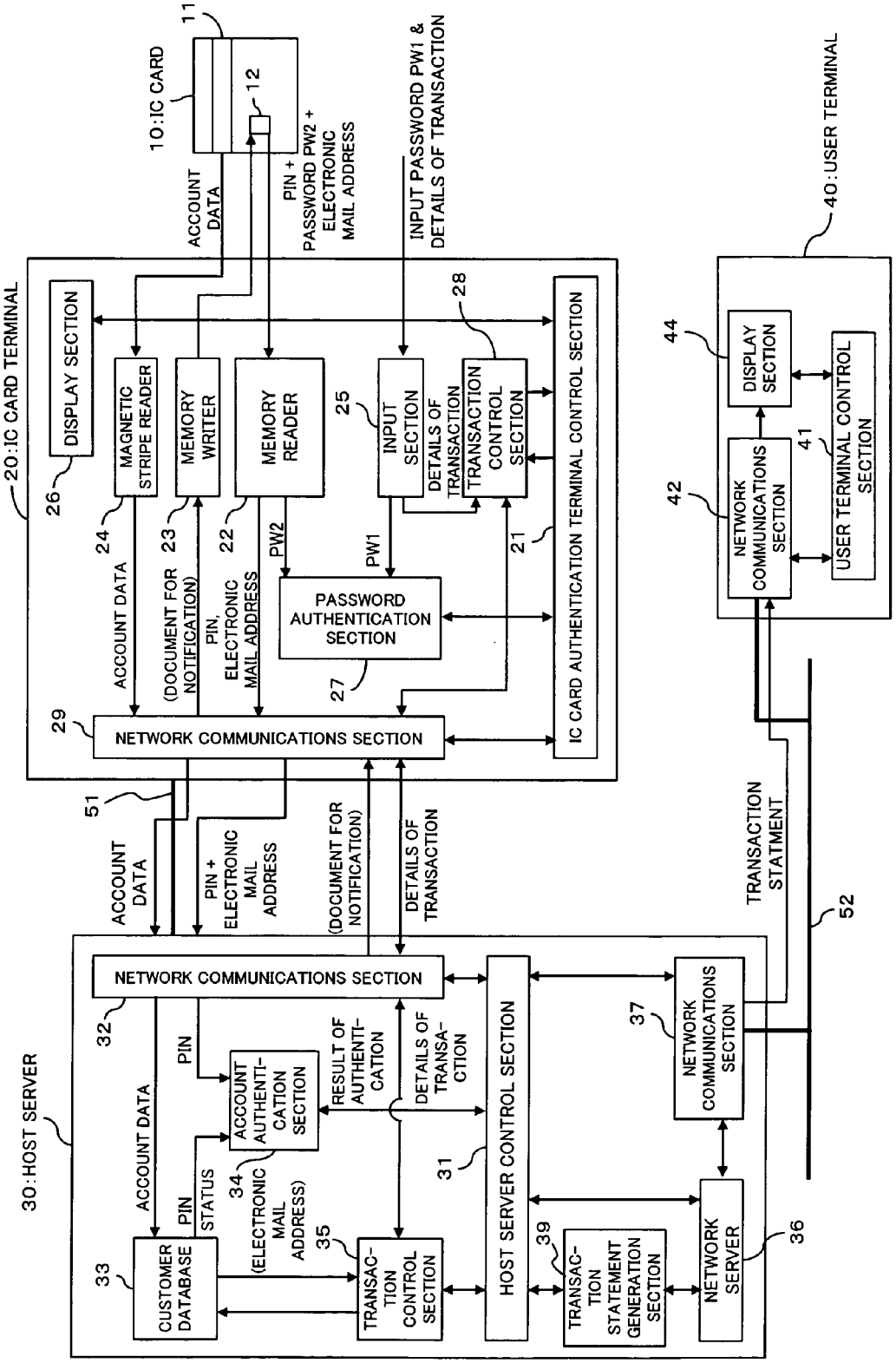
FIG. 11 is a block diagram showing the configuration of a transaction system serving as a second embodiment of the present invention.

FIG. 11 is a block diagram showing the configuration of a transaction system serving as a second embodiment of the present invention. As shown in FIG. 11, a transaction system of the second embodiment is basically constituted of the IC card 10; the authentication terminal 20 for the IC card; the host server 30; the user terminal 40; the network 51; and the network 52, as is the transaction system of the first embodiment. In FIG. 11, reference numerals identical with the existing reference numerals designate identical or substantially-identical constituent elements, and their detailed descriptions are omitted.

The electronic mail address of the user of the IC card 10 is recorded in advance in the IC memory 12 of the IC card 10 of the second embodiment. As described in connection with the first embodiment, the electronic mail address can be written or rewritten by means of making an access to the host server 30 by way of the user terminal 40. Instead of being recorded in the IC memory 12, the electronic mail address of the user may be stored in the customer database 33 of the host server 30 in association with the account number of the user.

The IC card authentication terminal 20 of the second embodiment is constituted in substantially the same manner as in the first embodiment. In the second embodiment, the electronic mail address of the user is read from the IC memory 12 by means of the memory reader 22 in conjunction with a password and a PIN. When the person who has input the password is authenticated as the user of the IC card 10 by the password authentication section 27, the electronic mail address read by the memory reader 22 is transmitted from the IC card authentication terminal 20 to the host server 30.

The host server 30 of the second embodiment is also constituted in substantially the same manner as in the first embodiment. In the second embodiment, the transaction statement generation section 39 is provided in lieu of the user request storage section 38 of the first embodiment. The transaction statement generation section 39 is managed and controlled by the host server control section 31 and generates a notification document (a statement of a transaction and details thereof) from details of the currently-conducted transaction after completion of the transaction (every time a transaction is conducted). In reality, the transaction statement generation section is realized by means of a predetermined program being executed by an existing CPU constituting the host server 30.

The notification document generated by the transaction statement generation section 39 is transmitted, in the form of an electronic mail, to the electronic mail address of the user who has conducted the transaction, by means of the network server 36 through the network communications section 37 and the network 52.

The host server 30 of the second embodiment may be provided with the function of the user request storage section 38 of the first embodiment.

The user terminal 40 of the second embodiment is also constituted in substantially the same manner as in the first embodiment. In the second embodiment, the user terminal has the function for receiving an electronic mail and is provided with a display section 44 in place of the input section 43 of the first embodiment. A display state of the display section 44 is controlled by the user terminal control section 41, and the display section is for displaying the statement document (a statement of a transaction and details thereof) received in the form of the electronic mail. In reality, the display section is a display (a CRT, an LCD, or the like) generally provided on a terminal. The user terminal 40 of the second embodiment may also be provided with the function of the input section 43 of the first embodiment.

Figure 12:
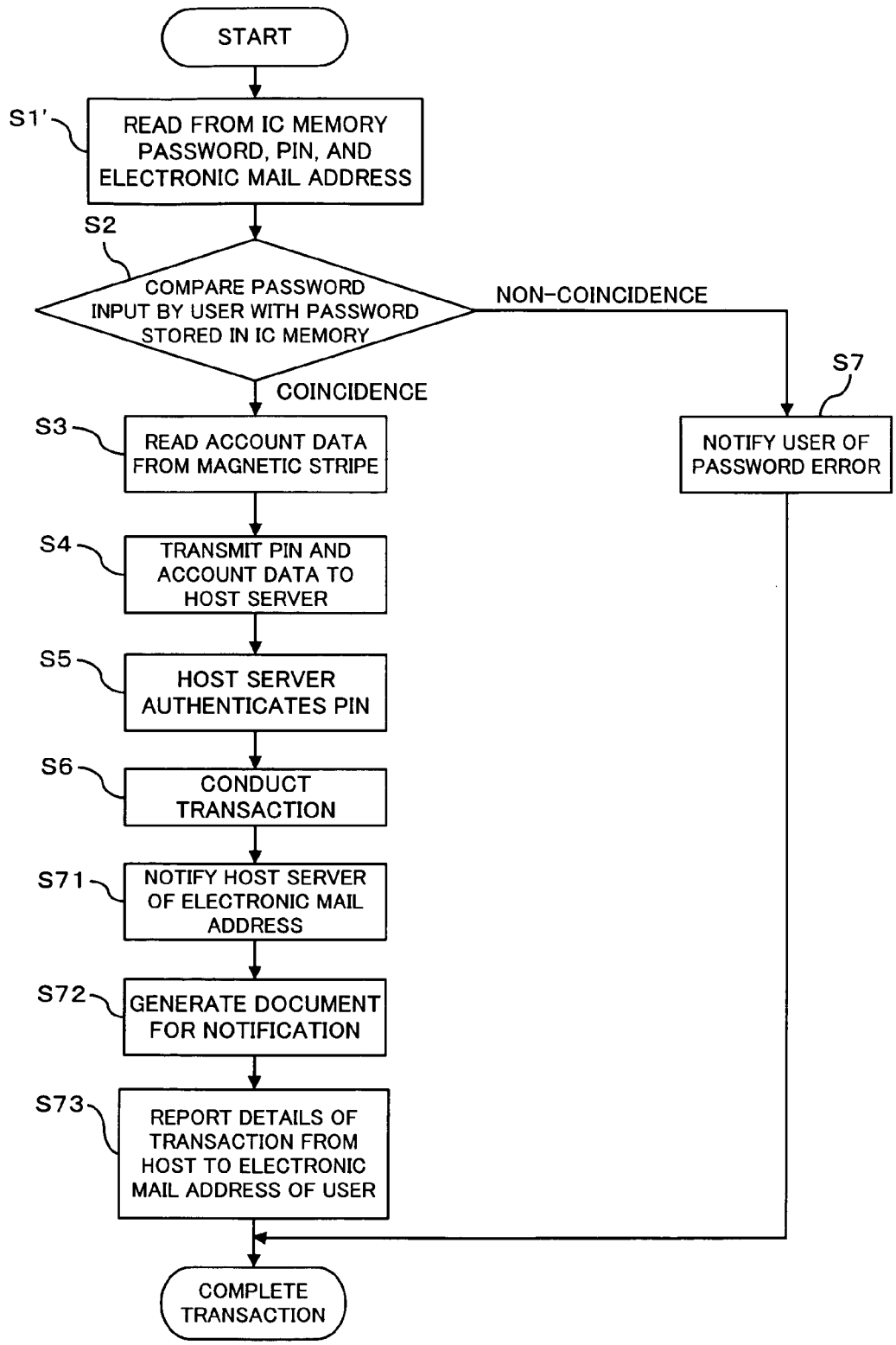
FIG. 12 is a flowchart for describing a first operation example of the second embodiment.

A first operation example of the transaction system of the second embodiment will be described by reference to FIG. 12. FIG. 12 is a flowchart (step S1', steps S2 to S7, and steps S71 to S73) for describing the first operation example. In FIG. 12, steps S2 to S7 are the same as those described by reference to FIG. 3, and their repeated descriptions are omitted.

In the first operation example of the second embodiment, when the user inserts the IC card 10 into the IC card authentication terminal 20 on occasion of initiation of the transaction involving usage of the IC card 10 by means of the IC card authentication terminal 20, the memory reader 22 reads the electronic mail address of the user from the IC memory 12 of the IC card 10 along with a password and a PIN (step S1').

Subsequently, processing (steps S2 to S7) is performed in accordance with procedures described by reference to FIG. 3. When the transaction is completed in step S6, the electronic mail address of the user is reported to the host server 30 from the IC card authentication terminal 20 (step S71). In step S4, the electronic mail address may be transmitted along with the PIN and the account data rather than being reported to the host server 30 after completion of the transaction.

The notification document is generated from details of the currently-conducted transaction by means of the transaction statement generation section 39 of the host server 30 (step S72), and the notification document (details of the transaction) is transmitted, in the form of an electronic mail, to the electronic mail address of the user who has conducted the transaction by means of the network server 36 (step S73).

As mentioned above, the user can receive details of the transaction as electronic data by means of the electronic mail. Hence, the history of transactions can be stored as electronic data in the user terminal 40, and cashier records, such as an electronic bankbook or an electronic housekeeping book, can be readily built in the user terminal 40.

In the first operation example of the second embodiment, details of a transaction are transmitted, in the form of an electronic mail, to the user's address every time the transaction using the IC card 10 is conducted. Even if a third party has fraudulently used the IC card 10, fraudulent usage of the card is immediately reported, whereupon the user can immediately become aware of fraudulent use of the card. At this time, if data pertaining to the location of a local office where the IC card 10 of the IC card authentication terminal 20 has been used are added to the notification document to be reported in the form of an electronic mail, there is yielded an advantage of the ability to immediately report actions of the unauthorized user to the police or an IC card management company (a credit loan company, a bank, or the like).

Sending details of the transaction to the electronic mail address of the user is not limited to the transaction using the IC card 10, but may be carried out at the time of a transaction using a conventional card with a magnetic stripe. In this case, details of a transaction are sent to the electronic mail address of the user by means of an electronic mail in the same manner mentioned previously every time a transaction is conducted, so long as the electronic mail address of the user is registered in advance in the magnetic stripe of the conventional card or the customer database 33 of the host server 30.

In the first operation example of the second embodiment, the host server 30 is notified of the electronic mail address from the IC card authentication terminal 20 and transmits the notification document to the electronic mail address. However, the electronic mail address of the user may be stored in the customer database 33 of the host server 30 in association with the account number of the user. The notification document may be transmitted to the electronic mail address which has been retrieved from the customer database 33 while the account number (account data) transmitted from the IC card authentication terminal 20 is taken as a cue.

Moreover, in the first operation example of the second embodiment, details of the transaction (the notification document) are transmitted to the electronic mail address of the user from the host server 30. The IC card authentication terminal 20 may generate the notification document from details of the transaction and transmit the notification document to the electronic mail address of the user from the IC card authentication terminal 20.

Figure 13:
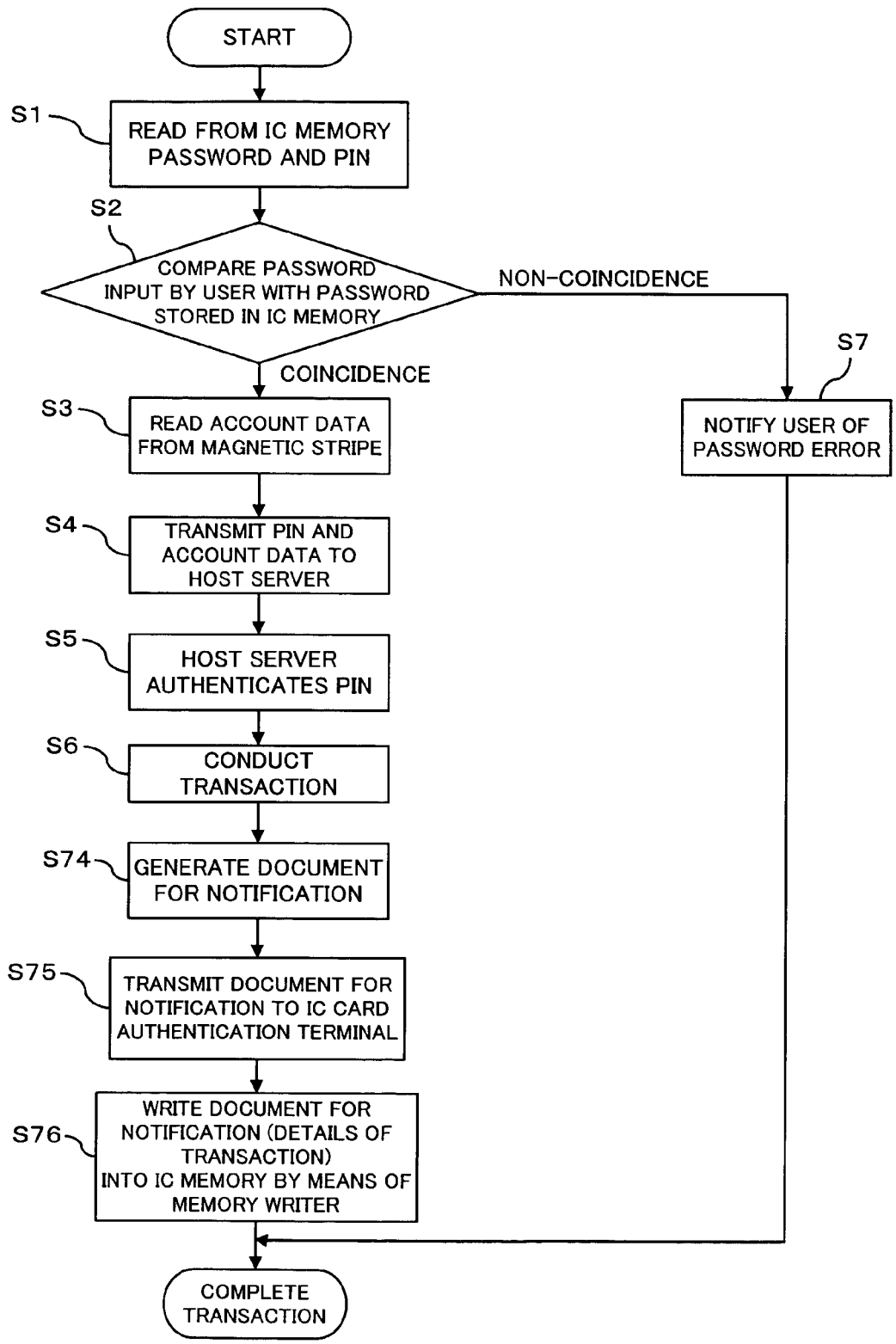
FIG. 13 is a flowchart for describing a second operation example of the second embodiment.

A second operation example of the transaction system of the second embodiment will now be described by reference to FIG. 13. FIG. 13 is a flowchart (steps S1 to S7 and S74 to S76) for describing a second operation example. In FIG. 13, steps S1 to S7 are the same as those described by reference to FIG. 3, and their repeated explanations are omitted.

Even in the second operation example of the second embodiment, when the user inserts the IC card 10 into the IC card authentication terminal 20 on occasion of initiation of the transaction involving usage of the IC card 10 by means of the IC card authentication terminal 20, processing (steps S1 to S7) is performed in accordance with the procedures having been described by reference to FIG. 3. When the transaction is completed in step S6, the transaction statement generation section 39 of the host server 30 generates the notification document (a transaction statement) from details of the currently-conducted transaction (step S74). The notification document is transmitted to the IC card authentication terminal 20 from the network communications section 32 by way of the network 51 (step S75). In the IC card authentication terminal 20, the notification document sent from the host server 30 is written into the IC memory 12 of the IC card 10 as the details of the transaction by means of the memory writer 23 every time the transaction is completed (step S76).

As mentioned previously, the details of the transaction (the notification document) written in the IC memory 12 of the IC card 10 are transmitted to the host server 30 from the IC card authentication terminal 20, by means of reading the details of the transaction and the electronic mail address from the IC memory 12 with the memory reader 22 in accordance with the user's reading request. The read details of the transaction are transmitted in the form of an electronic mail to the read electronic mail address by means of the host server 30 (the network server 36). The details of the transaction may be transmitted to the electronic mail address by means of the IC card authentication terminal 20 rather than by means of the host server 30.

At this time, a request to read the details of the transaction may be issued by way of the input section 25 of the IC card authentication terminal 20 when the user is conducting the transaction with the IC card 10 inserted in the IC card authentication terminal 20. The reading request may be issued by way of the user terminal 40 as in the case of the fifth and sixth operation examples of the first embodiment.

When the reading request is issued from the user terminal 40 as in the latter case, the host server 30 must be provided with the function of the user request storage section 38 of the first embodiment. The reading request is temporarily stored in the user request storage section 38. When, at a later time, the user inserts the IC card 10 into the IC card authentication terminal 20 to conduct a transaction using the IC card 10, details of the transaction and the electronic mail address are read and transmitted from the IC memory 12 by means of the memory reader 22.

A transaction statement is currently issued every time a transaction is conducted by means of a common ATM terminal. However, issuance of the transaction statement can be omitted by means of storing details of the transaction (a transaction statement) in the IC memory 12 in the second operation example of the second embodiment, and hence paperless issuance of the statement can be realized. When the user desires details of the transaction stored in the IC memory 12 as electronic data, the details are transmitted to the electronic mail address in the IC memory 12. As a result, the user can acquire the details of the transaction in the IC memory 12 without possessing the IC memory reader.

As mentioned previously, an acquisition request (the reading request) may be issued by way of the IC card authentication terminal 20 or by way of the user terminal 40 installed in the home/office. However, when the acquisition request is issued from the user terminal 40, details of a transaction are actually reported by means of an electronic mail when the user has conducted a transaction using the IC card 10 by way of the IC card authentication terminal 20 after issuance of the acquisition request.

Thus, according to the transaction system of the second embodiment of the present invention, the electronic mail address of the user is recorded in the IC memory 12 of the IC card 10. After completion of the transaction, the host server 30 immediately transmits the details of the transaction to the electronic mail address. The user can save the details of the transaction as an electronic mail (electronic data). In the event that a card has been fraudulently used, the user can immediately ascertain fraudulent use of the card.

The details of the transaction are written and stored in the IC memory 12 of the IC card 10 by means of the memory writer 23 after completion of the transaction. The company (e.g., a bank or a credit loan company) to which the host server 30 belongs does not need to issue the transaction statement in paper, and the history of transactions does not need to be stored in the host server 30, thereby rendering effective utilization of memory.

At this time, the electronic mail address of the user is recorded in the IC memory 12 of the IC card 10. When a transaction is conducted, details of the transaction are read from the memory reader 22 and sent to the electronic mail address. The user can acquire details of the transaction recorded in the IC memory 12 of the IC card 10 as an electronic mail (electronic data).

[3] Descriptions of a Third Embodiment

Figure 14:
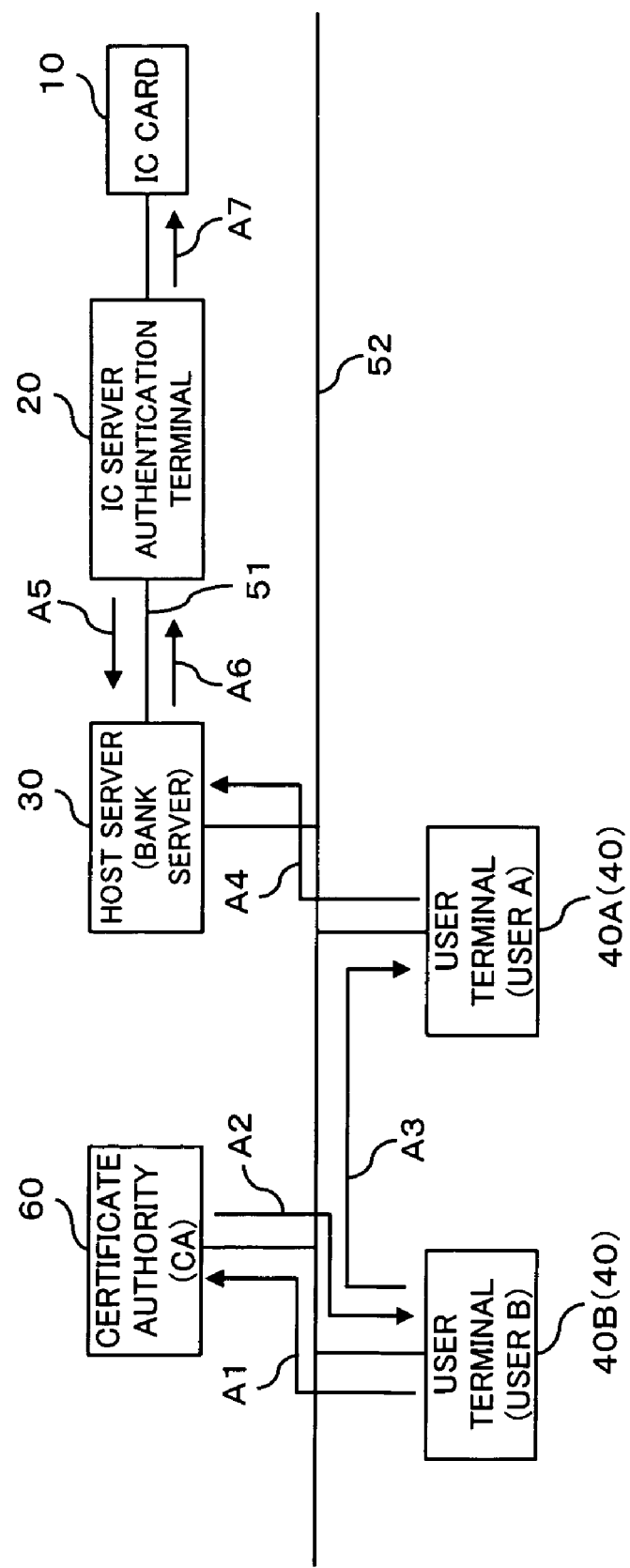
FIG. 14 is a block diagram showing the configuration of a transaction system serving as a third embodiment of the present invention.

FIG. 14 is a block diagram showing the configuration of a transaction system serving as a third embodiment of the present invention. As shown in FIG. 14, the transaction system of the third embodiment comprises a certificate authority 60 as well as the IC card 10, the IC card authentication terminal 20, the host server 30, the user terminal 40(40A, 40B), the network 51, and the network 52.

The user A owns the user terminal 40A, and the user B owns the user terminal 40B. The user terminals are substantially identical in basic configuration to the user terminal 40 shown in FIGS. 1 and 11. In the embodiment, as will be described in detail by reference to FIGS. 18A to 18C, the user A is a person who sells a commodity product (a seller), and the user B is a person who buys the commodity product (a buyer).

Figure 15:
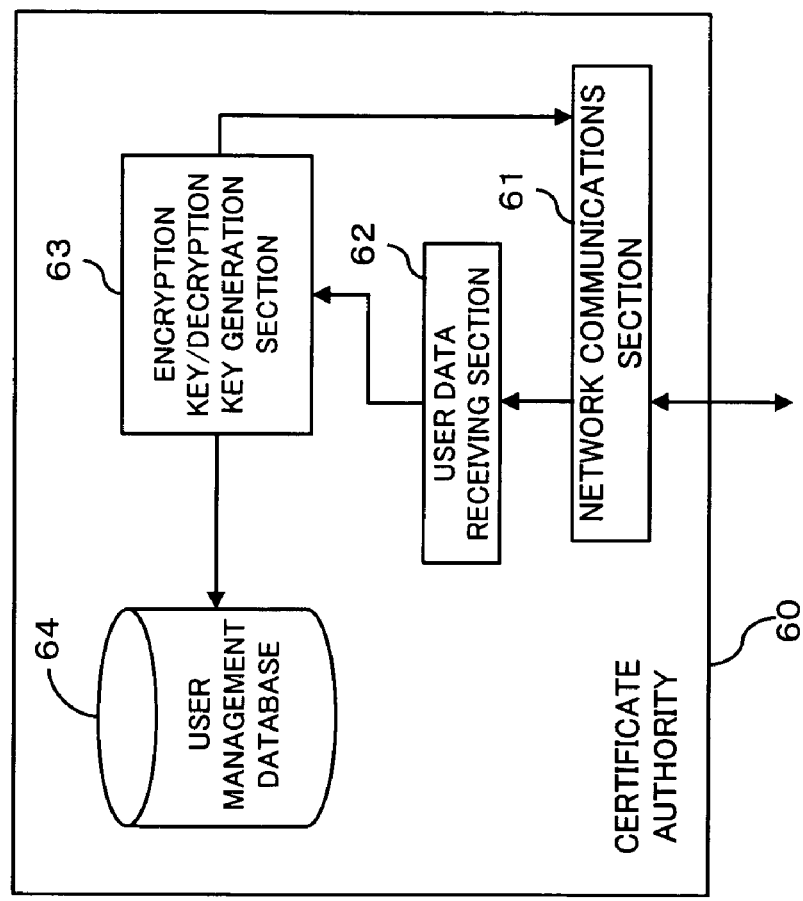
FIG. 15 is a block diagram showing the configuration of a certificate authority of the third embodiment.

The certificate authority (CA) 60 is connected to at least the user terminal 40B (40) in a communicable manner by way of the network 52. As shown in FIG. 15, the certificate authority comprises at least a network communications section 61, a user data receiving section 62, an encryption key/decryption key generation section 63, and a user management database 64. FIG. 15 is a block diagram showing the configuration of the certificate authority 60 of the third embodiment.

The network communications section 61 acts as a communications interface for exchanging data with the user terminal 40B by way of the network 52. The network communications section receives a registration request from the user terminal 40B (the user B) and user data (see arrow A1 in FIG. 14) and transmits an encryption key/decryption key generated in accordance with the registration request and the user data (see arrow A2 in FIG. 14).

The user data receiving section 62 receives the user data pertaining to the user B who has received the registration request, from among various data received by the network communications section 61. The encryption key/decryption key generation section 63 generates the encryption key/decryption key for the user B on the basis of the user data received by the user data receiving section 62. As mentioned previously, the generated encryption key/decryption key is returned from the network communications section 61 to the user terminal 40B (see arrow A2 in FIG. 14). The user management database 64 stores the encryption key/decryption key generated by the encryption key/decryption key generation section 63.

Figure 16:
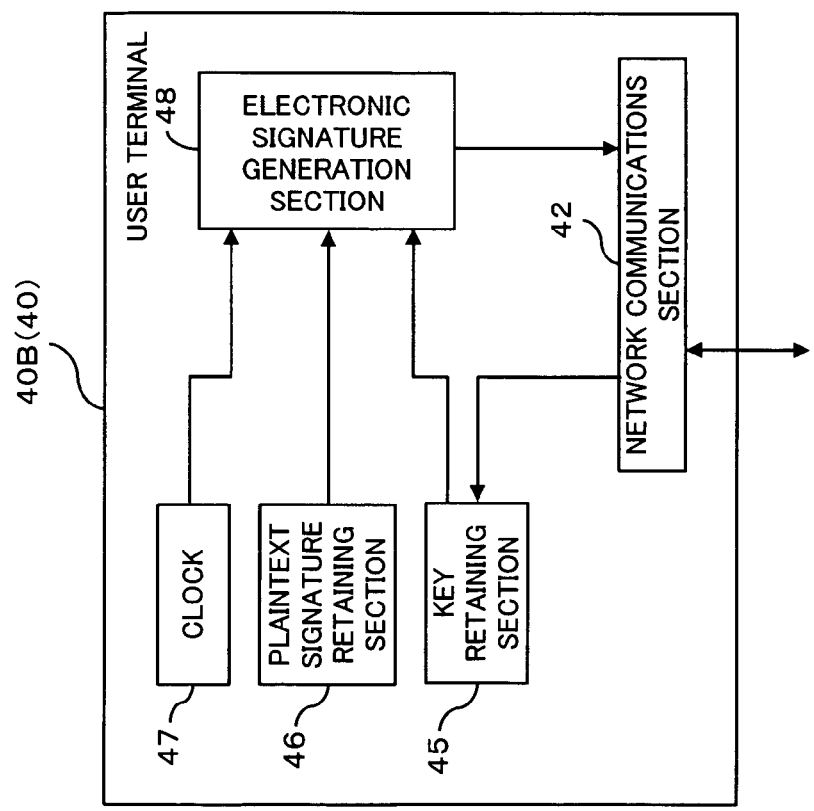
FIG. 16 is a block diagram showing the configuration of personal terminal equipment (user terminal equipment) of the third embodiment.

In addition to having the configuration of the user terminal 40 shown in FIGS. 1 and 11, the user terminal 40B (40) owned by the user B further comprises a key retaining section 45, a plaintext signature retaining section 46, a clock 47, and an electronic signature generation section 48. FIG. 16 is a block diagram showing the configuration of the user terminal 40B of the third embodiment.

The network communications section 42 in the user terminal 40B acts as a communications interface for exchanging data with the certificate authority 60 and the user terminal 40A by way of the network 52. In addition to transmitting the registration request and the user data to the certificate authority 60 (see arrow A1 in FIG. 14) and receiving the encryption key/decryption key from the certificate authority 60 (see arrow A2 in FIG. 14), the network communications section transmits to the user terminal 40A electronically-signed data pertaining to an account from which money is to be transferred (account data pertaining to existence/absence of the account of the user B) before the user B purchases a commodity product from the user A (see arrow A3 in FIG. 14).

The key retaining section 45 is for retaining the encryption key/decryption key received from the certificate authority 60. The plaintext signature retaining section 46 is for retaining a plaintext signature including the account data pertaining to the user B to be transmitted to the host server 30 by way of the user A. The clock 47 is for determining the current date and time.

The electronic signature generation section 48 is for generating an electronic signature before the user B purchases a commodity product from the user A, by means of encrypting a plaintext signature retained in the plaintext signature retaining section 46 and the date data output from the clock 47 through use of an encryption key retained in the key retaining section 45 (the encryption key issued by the certificate authority 60). The electronic signature (the electronically-signed data pertaining to an account from which money is to be transferred) generated by the electronic signature generation section 48 is returned to the user terminal 40B from the network communications section 42, as mentioned previously (see arrow A3 in FIG. 14).

The network communications section 42 in the user terminal 40A acts as a communications interface for exchanging data with the user terminal 40B and the host server 30 by way of the network 52. In addition to receiving the electronic signature (the electronically-signed data pertaining to an account from which money is to be transferred) from the user terminal 40B (see arrow A3 in FIG. 14), the network communications section transmits, to the host server 30, details of a transaction with the user B and the electronic signature output from the user B (see arrow A4 in FIG. 14).

Figure 17:
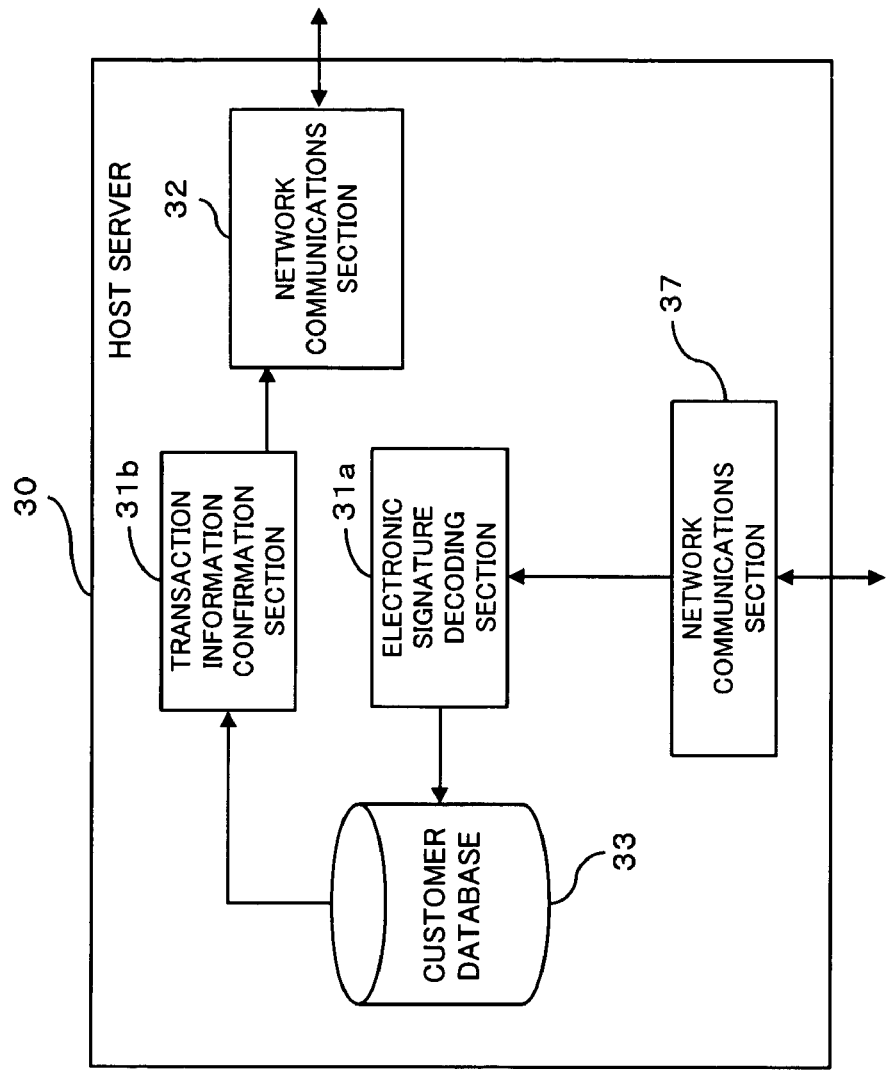
FIG. 17 is a block diagram showing the configuration of a host server (a bank server) of the third embodiment.

In addition to having the configuration of the host server 30 shown in FIGS. 1 and 11, the host server (bank server) 30 of the third embodiment is configured to have an electronic signature decryption section 31*a* and a transaction data confirmation section 31*b*. FIG. 17 is a block diagram showing the configuration of the host server 30 in the third embodiment.

The network communications section 37 in the host server 30 acts as a communications interface for exchanging data with the user terminal 40A by way of the network 52 and receives details of the transaction with the user B and an electronic signature of the user B from the user terminal 40A (see arrow A4 in FIG. 14).

The electronic signature decryption section 31*a* ascertains that the user B is a transaction counterpart of the user A, by means of decrypting the electronic signature output from the user terminal 40A with the decryption key, as well as registering the details of the transaction in the account of the user B along with the account data pertaining to the user A by means of having ascertained that the account of the user B is in the bank to which the host server 30 belongs. Specifically, the details of the transaction and the account data pertaining to the user A are stored in the customer database 33 in association with the account number of the user B.

Upon receipt from the IC card authentication terminal 20 of the notification indicating that the user B has conducted the transaction using the IC card 10 by means of the IC card authentication terminal 20 (see arrow A5 in FIG. 14), the transaction data confirmation section 31*b* ascertains the transaction data (details of the transaction) pertaining to the user B registered in the customer database 33 and transmits the transaction data to the IC card authentication terminal 20 by way of the network communications section 32 and the network 51 (see arrow A6 in FIG. 14).

Upon receipt of the transaction data pertaining to the user B from the host server 30, the IC card authentication terminal 20 of the third embodiment writes the transaction data (data pertaining to the transaction counterpart of the user B; that is, data pertaining to a partner necessary for the user B to conduct a transaction) into the IC card 10 (the IC memory 12) of the user B for which the transaction is being conducted, by means of the memory writer 23 (see arrow A7 in FIG. 14).

Basic operation of the transaction system of the third embodiment will be described in comparison with operation of the common transaction system by reference to FIGS. 18A to 18C.

Figure 18A:
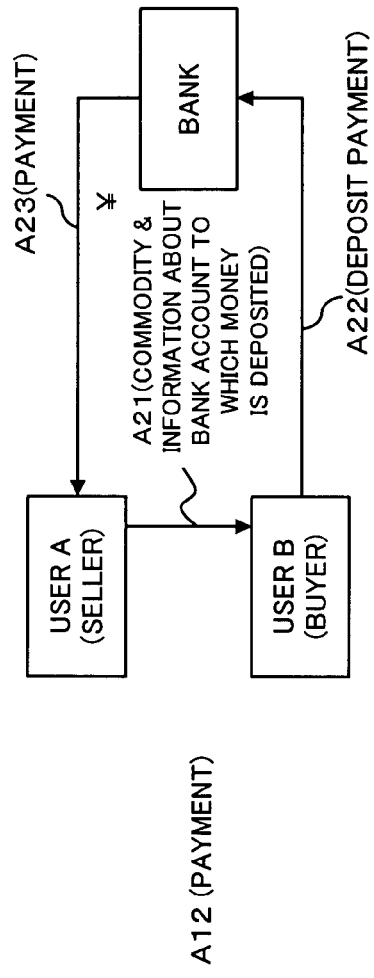
FIGS. 18A to 18C are views for describing basic operations of the transaction system of the third embodiment in comparison with operations of a common transaction system.

FIG. 18A is for describing operation of the common transaction system using cash settlement. In the transaction system shown in FIG. 18A, upon receipt of the commodity product from the user A (seller) (see arrow A11), the user B (buyer) makes a payment for the commodity product to the user A (see arrow A12), thereby completing a transaction.

Figure 18B:
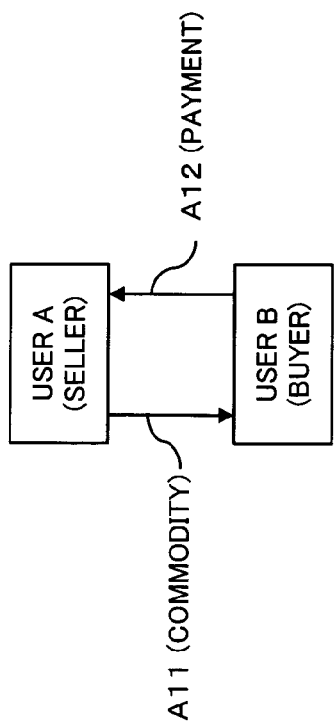

FIG. 18B is for describing operation of the ordinary transaction system based on bank settlement. In the transaction system shown in FIG. 18B, when the user A has passed to the user B the commodity product and data pertaining to an account into which money is to be transferred (bank data pertaining to the user A) (see arrow A21), the user B makes a payment for the commodity product to the user A on the basis of the account data pertaining to the user A (see arrow A22), and the bank then deposits funds into the account of the user A, whereupon the transaction is completed (see arrow A23).

Figure 18C:
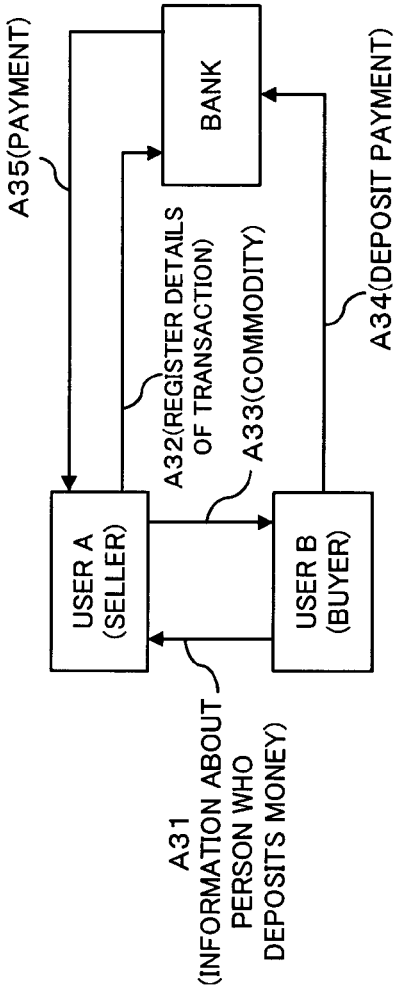

FIG. 18C is for describing basic operation of the transaction system of the third embodiment. In the transaction system shown in FIG. 18C, the user B first transmits data pertaining to the (electrically-signed) account from which money is to be transferred (arrow A31 corresponding to arrow A3 in FIG. 14) before purchasing the commodity product from the user A. The user A transmits to the bank and registers the data pertaining to the (electrically-signed) account from which money is to be transferred and details of the transaction (arrow A32 corresponding to arrow A4 in FIG. 14). When presence/absence of the account of the user B has been ascertained by the bank on the basis of the data pertaining to the account from which money is to be transferred, the user A passes the commodity product to the user B (arrow A33).

Subsequently, when having conducted some transaction using the IC card 10 by means of the IC card authentication terminal 20, the user B is notified of presence of the data which pertain to the transaction with the user A and are registered in the bank (include details of the transaction and data pertaining to the bank of the user A). The transaction data are written into the IC memory 12 of the IC card 10. On the basis of the transaction data written in the IC memory 12, the user B transfers a payment for the commodity to the user A (see arrow A34), and the bank deposits money into the account of the user A, whereupon the transaction is completed (see arrow A35).

Figure 19:
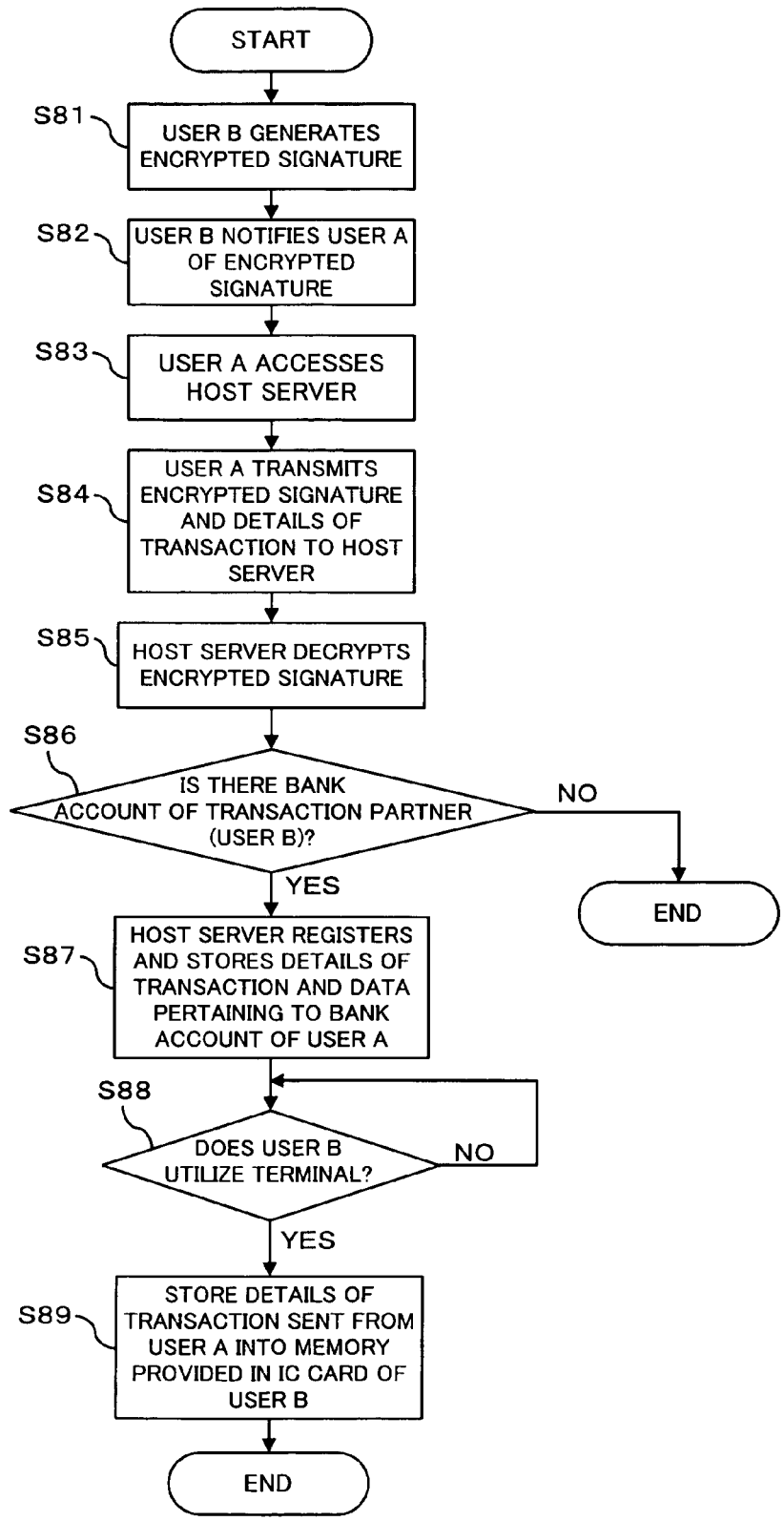
FIG. 19 is a flowchart for describing a first operation example of the third embodiment.

Next, a first operation example (transaction procedures) of the transaction system of the third embodiment required when the user B purchases a commodity product from the user A will be described, by reference to the flowchart shown in FIG. 19 (steps S81 to S89).

When commencing a transaction with the user A, the user B generates an encryption signature (an electronic signature) from the encryption key output from the certificate authority 60 by means of the user terminal 40B (step S81), and the encrypted signature is reported to the user A (step S82).

Upon receipt of the encrypted signature from the user B, the user A accesses the host server 30 from the user terminal 40A (step S83) and transmits to the host server 30 the encrypted signature from the user B and details of the transaction with the user B (the amount of money, a time limit, or the like) (step S84).

The host server 30 decrypts the encrypted signature of the user B received from the user terminal 40A, thereby ascertaining presence/absence of the account of the user B (step S85). When the account of the user B is not present (a route designated by selecting NO in step S85), the host server 30 sends a notification to this effect to the user terminal 40A, thereby completing processing.

When the account of the user B is present (a route designated by selecting YES in step S85), the host server 30 sends a notification to this effect to the user terminal 40A, and registers and stores the details of the transaction and the account data pertaining to the user A into the customer database 33 in association with the account data pertaining to the user B (step S86). The user A notified of the notification indicating presence of the account of the user B dispatches the commodity product to the user B.

Subsequently, the user B, having conducted some transaction using the IC card 10 by way of the IC card authentication terminal 20 (a route designated by selecting YES in step S87), is notified of presence of data pertaining to the transaction (including details of the transaction and the account data pertaining to the user A) with the user A registered in the host server 30 (the customer database 33). The transaction data are written into the IC memory 12 of the IC card 10 (step S89). On the basis of the transaction data written in the IC memory 12, the user B transfers a payment for the commodity product to the user A.

Figure 20:
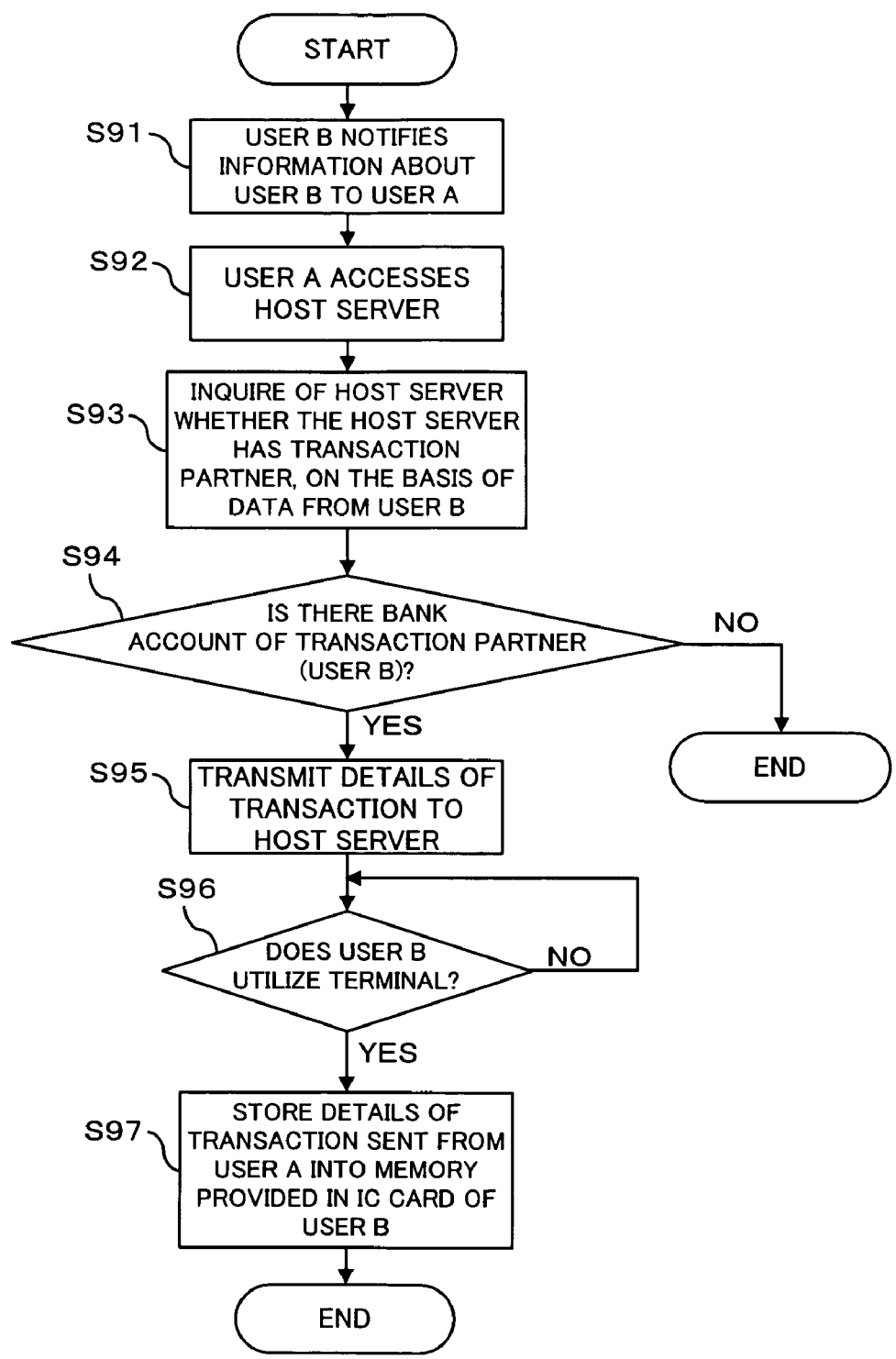
FIG. 20 is a flowchart for describing a second operation example of the second embodiment.

In the previously-described first operation example, an electronic signature (an encrypted signature) is made through use of the encryption key issued by the certificate authority 60, whereby the transaction is conducted while authenticating the user B. However, the user A and the user B can conduct a transaction without use of such an electronic signature (encrypted signature). Such an example will now be described as a second operation example (transaction procedures) of the transaction system of the third embodiment by reference to a flowchart (steps S91 to S97) shown in FIG. 20.

When commencing a transaction with the user A, the user B sends to the user terminal 40A data pertaining to itself (user data) from the user terminal 40B (step S91). Upon receipt of the notification from the user B, the user A accesses the host server 30 by way of the user terminal 40A (step S92), thereby making an inquiry about presence/absence of the account of the transaction counterpart (the user B) (step S93). The host server 30 having received the inquiry ascertains presence/absence of the account of the user (step S94). When the account of the user B is not present (a route designated by selecting NO in step S94), the host server 30 sends a notification to this effect to the user terminal 40A, thereby terminating processing.

When the account of the user B is present (a route designated by selecting YES in step S94), the host server 30 sends a notification to this effect to the user terminal 40A. The user A having received the notification sends details of the transaction (the amount of money and a time limit) to the host server 30 by way of the user terminal 40A (step S95). The host server 30 registers and stores the details of the transaction sent from the user terminal 40A and the account data pertaining to the user A into the customer database 33 in association with the account data of the user B. The user A notified of presence of the account of the user B dispatches the commodity product to the user B.

Subsequently, the user B, having conducted some transaction using the IC card 10 by way of the IC card authentication terminal 20 (a route designated by selecting YES in step S96), is notified of presence of data pertaining to the transaction (including details of the transaction and the account data pertaining to the user A) with the user A registered in the host server 30 (the customer database 33). The transaction data are written into the IC memory 12 of the IC card 10 (step S97). On the basis of the transaction data written in the IC memory 12, the user B transfers a payment for the commodity product to the user A.

As mentioned above, in the transaction system of the third embodiment of the present invention, when a commodity product is sold to a customer (the user B) through, e.g., mail order selling, the account data pertaining to a seller (the user A) are transmitted to the host server 30 in connection with the transaction account of the customer (the user B) taught by the customer (the user B). Subsequently, when the customer (the user B) conducts a transaction using the IC card 10, data pertaining to the transaction account are reported by means of the display section 26 and written into the IC memory 12 of the IC card 10 of the customer (the user B).

When the data pertaining to the transaction account are displayed, only the name of the transaction and the amount of money are displayed without displaying the name of the bank and the account number of the data pertaining to the transaction counterpart, whereby private data (the account data or the like) are not reported to the customer (the user B). Hence, a transaction between the user A and the user B can be realized while preventing leakage of the private data pertaining to the user A.

Specifically, according to the transaction system of the third embodiment, the following working-effects can be yielded.

1) There is no necessity for sending to a transaction counterpart personal data (account data) pertaining to the user A.

2) The credibility rating of the transaction counterpart (the user B) can be confirmed by ascertaining the data (presence/absence of the account) of the transaction counterpart (the user B).

3) The user B does not need to send personal data to the transaction counterpart (the user A) unless the account number is used as data pertaining to the transaction counterpart (the user B).

The data pertaining to the transaction counterpart (the user B) do not need to be an account number. Any data can be employed; for instance, an ID number which enables specification of the account of the transaction counterpart (the user B), an encrypted electronic signature which can be decrypted by a bank, and data which enable designation of presence of a transaction counterpart and presence of an account in the bank. The host server 30 of the bank has the account data pertaining to both the user A and the user B. However, the users A, B can conduct a settlement without knowing the account data.

[4] Others

The present invention is not limited to the previously-described embodiments and can be carried out in various modified forms without departing from the gist of the present invention.

For instance, in the previously-described embodiment, the magnetic stripe reader 24 reads the account data from the magnetic stripe 11. However, when the account data have been stored in advance in the IC memory 12 and the IC card 10 is inserted into the IC card authentication terminal 20, the memory reader 22 may read the PIN and the password from the IC memory 12.

Figure 21:
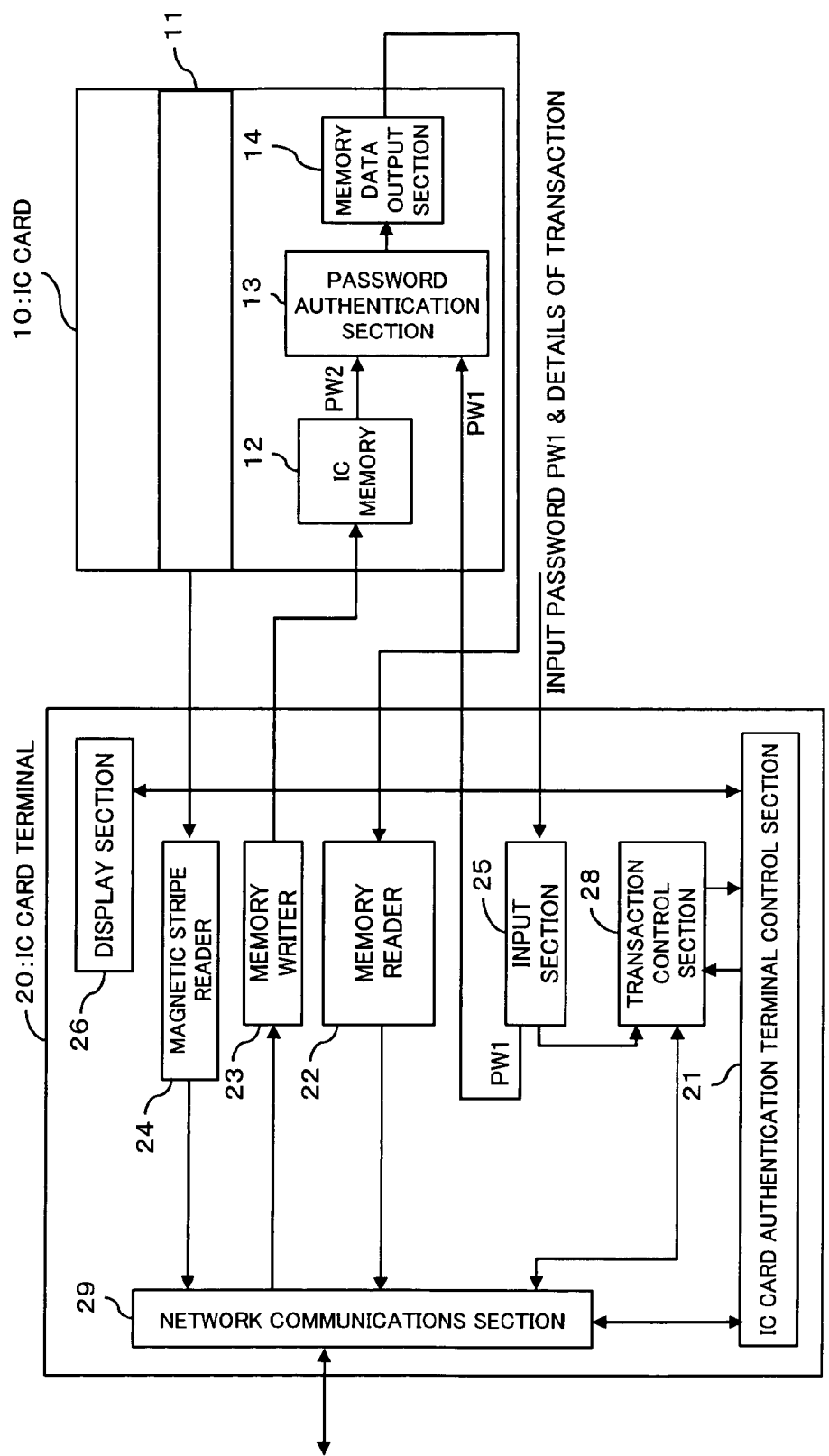
FIG. 21 is a block diagram showing a modification of a password authentication function of the present invention.

In the present embodiment, the password is authenticated by means of the password authentication section 27 in the IC card authentication terminal 20. However, as shown in FIG. 21, the function of the password authentication section 27 (the password authentication section 13) may be embodied by means of a CPU or the like incorporated in the IC card 10. FIG. 21 is a block diagram showing a modification of the password authentication function of the present invention. In this case, the password authentication section (see reference numeral 27 in FIGS. 1 and 11) in the IC card authentication terminal 20 can be omitted.

In this case, the IC card authentication terminal 20 transmits, to the IC card 10, the password PW1 input from the input section 25 by the user. The IC card 10 compares the password PW1 transmitted from the IC card authentication terminal 20 with the password PW2 in the IC memory 12. When the passwords PW1 and PW2 coincide with each other, the memory data output section 14 of the IC card 10 outputs data (such as a PIN) in the IC memory 12 to the memory reader 22 of the IC card authentication terminal 20.

Upon receipt of the data from the IC card 10, the memory reader 22 transmits the data to the host server 30 along with the account data read from the magnetic stripe 11. In contrast, when the passwords PW1 and PW2 fail to coincide with each other, the memory data output section 14 of the IC card 10 does not output the data in the IC memory 12. Transaction operations subsequent to this are the same as those described in connection with the first and second embodiments, and hence their repeated explanations are omitted.

By means of such a configuration, the password of the IC card 10 can be authenticated by the IC card 10. Specifically, the password of the IC card 10 can be authenticated by either the IC card authentication terminal 20 or the IC card 10.

After having transmitted the password PW1 from the IC card authentication terminal 20 to the IC card 10, the IC card authentication terminal control section 21 monitors whether or not the data are input by the IC card 10 within a predetermined period of time. If no data are input within the predetermined period of time, a timeout error will arise. A notification indicating that the password input by the user has failed to coincide with the stored password is sent to the user.

A configuration such as that shown in FIG. 21 can be applied to any of the previously-described first through third embodiments.

INDUSTRIAL APPLICABILITY

As mentioned previously, according to the present invention, when a person who has entered authentication data (a password or the like) is authenticated as a user of a card, transaction data read from a magnetic stripe of the card and transaction authentication data read from memory of the card are transmitted to a host server, where a transaction based on the data is conducted. As a result, transaction terminal equipment compatible with a settlement card of IC card type can be installed without changing the configuration of the host server. Specifically, the host server still remains as ever, and hence the system to which the present invention is applied enables mixing of the transaction terminal equipment of the present invention and transaction terminal equipment for a conventional settlement card with a magnetic stripe. In the event of a shift from the system adopting the conventional settlement card to the system adopting the settlement card of IC card type, the entire system does not need to be changed collectively. A system shift can be effected at low cost.

Moreover, data are written into the memory of the card or the data recorded in the memory are rewritten at the time of conduction of a transaction, by means of a memory writer in the transaction terminal equipment. Specifically, even when the user does not possess any special card writing device or does not stand in line in front of an ATM terminal or the window for rewriting the data in the memory or the like, the user can write data into the memory of the card or rewrite the data in the memory simultaneously with conducting a desired transaction by means of the transaction terminal equipment.

Accordingly, the present invention is suitable for use in a transaction by way of the ATM terminal using a bank cash card, a transaction using a debit card in a shop, and a transaction using a settlement card, e.g., as shopping/cashing involving usage of a credit card or a cash card, through use of a credit card of a credit loan company. The invention effectively functions at the time of the previously-described system shift and contributes to significant proliferation of the settlement card of IC card type. Hence, the invention is considered to have extremely high usefulness.

What is claimed is:

1. A transaction terminal equipment, the terminal equipment comprising:
    a magnetic stripe reader reading transaction data required to conduct a transaction from a magnetic stripe of a card;
    a memory reader reading electronic data from a memory provided to said card, said electronic data including transaction authentication data that has been used for a transaction using said card, user authentication data to authenticate a user that is different from said transaction authentication data, and transaction requirements of respective transaction types;
    a memory writer writing said electronic data into said memory; and
    an input section inputting authentication data to be used to authenticate said user of said card, and
    wherein
    said terminal equipment is connected, in a communicable manner, with a host server which conducts said transaction,
    said data read from said magnetic stripe of said card and said data read from said memory are transmitted to said host server subsequent to authentication of a person inputting said authentication data via said input section as said user of said card,
    said host server conducts said transaction using said transaction data and said transaction authentication data, both transmitted from said terminal equipment when said transaction meets a respective transaction requirement among said transaction requirements of respective transaction types, and
    said memory writer writes data into said memory of said card and rewrites said electronic data recorded in said memory as a result of completion of said transaction.

2. The transaction terminal equipment according to claim 1, further comprising:
    an authentication section which authenticates the person who has input said authentication data as said user of said card, by comparing said authentication data input by way of said input section with said user authentication data read from said memory by said memory reader, and
    wherein said transaction data read by said magnetic stripe reader and said transaction authentication data read by said memory reader are transmitted to said host server when said person who has input said authentication data is authenticated as said user of said card by said authentication section.

3. The transaction terminal equipment according to claim 1, wherein details of said transaction are transmitted to an electronic mail address of said user of said card registered in said card in advance, every time said transaction is conducted.

* * * * *